(12) United States Patent
Jensen

(10) Patent No.: US 10,511,552 B2
(45) Date of Patent: *Dec. 17, 2019

(54) AGGREGATED PRESENCE OVER USER FEDERATED DEVICES

(71) Applicant: AT&T Intellectual Property I, L.P., Atlanta, GA (US)

(72) Inventor: Patrick John Jensen, Fresno, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 142 days.

This patent is subject to a terminal disclaimer.

(21) Appl. No.: 14/968,017

(22) Filed: Dec. 14, 2015

(65) Prior Publication Data

US 2016/0099894 A1 Apr. 7, 2016

Related U.S. Application Data

(63) Continuation of application No. 12/535,062, filed on Aug. 4, 2009, now Pat. No. 9,258,376.

(51) Int. Cl.
*G06F 15/16* (2006.01)
*H04L 12/58* (2006.01)
*H04L 29/08* (2006.01)
*H04W 4/029* (2018.01)

(52) U.S. Cl.
CPC ............ *H04L 51/043* (2013.01); *H04L 51/20* (2013.01); *H04L 67/02* (2013.01); *H04L 67/24* (2013.01); *H04L 67/10* (2013.01); *H04W 4/029* (2018.02)

(58) Field of Classification Search
CPC .............................. H04L 51/043; H04L 67/02
See application file for complete search history.

(56) References Cited

U.S. PATENT DOCUMENTS

| | | |
|---|---|---|
| 5,675,733 A | 10/1997 | Williams |
| 5,720,771 A | 2/1998 | Snell |
| 5,793,365 A | 8/1998 | Tang et al. |
| 5,796,393 A | 8/1998 | MacNaughton et al. |
| 5,812,639 A | 9/1998 | Bartholomew et al. |
| 5,926,179 A | 7/1999 | Matsuda et al. |
| 6,047,327 A | 4/2000 | Tso et al. |

(Continued)

FOREIGN PATENT DOCUMENTS

| | | |
|---|---|---|
| WO | 03098449 | 11/2003 |
| WO | 03100637 | 12/2003 |

OTHER PUBLICATIONS

Newton; Telecom Dictionary; Definition of "Ack", CMP books, 20th edition, p. 42.

(Continued)

*Primary Examiner* — Hua Fan
(74) *Attorney, Agent, or Firm* — Chiesa Shahinian & Giantomasi PC

(57) ABSTRACT

One embodiment of a system for aggregating and distributing presence information comprises a hosted presence aggregator server. The hosted presence aggregator server receives an update of presence information from a user device and relays the presence information update to another user device, wherein the user devices are part of a federation of user devices controlled by a single user which relay updates in presence status of the single user to one another via the hosted presence aggregator server.

11 Claims, 20 Drawing Sheets

(56) References Cited

U.S. PATENT DOCUMENTS

| | | |
|---|---|---|
| 6,058,420 A | 5/2000 | Davies |
| 6,108,709 A | 8/2000 | Shinomura et al. |
| 6,151,507 A | 11/2000 | Laiho et al. |
| 6,219,045 B1 | 4/2001 | Leahy et al. |
| 6,286,033 B1 | 9/2001 | Kishinsky et al. |
| 6,301,609 B1 | 10/2001 | Aravamudan et al. |
| 6,425,006 B1 | 7/2002 | Chari et al. |
| 6,429,893 B1 | 8/2002 | Xin |
| 6,466,261 B1 | 10/2002 | Nakamura |
| 6,546,005 B1 | 4/2003 | Berkley et al. |
| 6,553,416 B1 | 4/2003 | Chari et al. |
| 6,584,494 B1 | 6/2003 | Manabe et al. |
| 6,591,094 B1 | 7/2003 | Bentley |
| 6,654,790 B2 | 11/2003 | Ogie et al. |
| 6,658,095 B1 | 12/2003 | Yoakum et al. |
| 6,665,375 B1 | 12/2003 | Forlenza et al. |
| 6,668,169 B2 | 12/2003 | Burgan et al. |
| 6,671,693 B1 | 12/2003 | Marpe et al. |
| 6,727,811 B1 | 4/2004 | Fendis |
| 6,731,308 B1 | 5/2004 | Tang et al. |
| 6,757,365 B1 | 6/2004 | Bogard |
| 6,757,722 B2 | 6/2004 | Lonnfors et al. |
| 6,771,173 B1 | 8/2004 | Clayton et al. |
| 6,816,578 B1 | 11/2004 | Kredo et al. |
| 6,879,677 B2 | 4/2005 | Trandal et al. |
| 6,944,555 B2 | 9/2005 | Blackett et al. |
| 6,954,136 B2 | 10/2005 | Sauer |
| 6,965,935 B2 | 11/2005 | Diong |
| 6,968,052 B2 | 11/2005 | Wullert, II |
| 6,968,179 B1 | 11/2005 | De Vries |
| 6,976,092 B1 | 12/2005 | Daniell et al. |
| 6,987,840 B1 | 1/2006 | Bosik et al. |
| 6,993,327 B2 | 1/2006 | Mathis |
| 7,015,806 B2 | 3/2006 | Naidoo et al. |
| 7,020,696 B1 | 3/2006 | Perry et al. |
| 7,043,530 B2 | 5/2006 | Issacs et al. |
| 7,058,036 B1 | 6/2006 | Yu et al. |
| 7,072,941 B2 | 7/2006 | Griffin et al. |
| 7,111,044 B2 | 9/2006 | Lee |
| 7,262,690 B2 | 8/2007 | Heaton et al. |
| 7,302,270 B1 | 11/2007 | Day |
| 7,313,617 B2 | 12/2007 | Malik et al. |
| 7,321,921 B2 | 1/2008 | Malik |
| 7,324,826 B2 | 1/2008 | Carey et al. |
| 7,353,455 B2 | 4/2008 | Malik |
| 7,370,278 B2 | 5/2008 | Malik et al. |
| 7,392,306 B1 | 6/2008 | Donner et al. |
| 7,395,329 B1 | 7/2008 | Holt et al. |
| 7,401,158 B2 | 7/2008 | Beauchamp et al. |
| 7,406,501 B2 | 7/2008 | Szeto et al. |
| 7,472,187 B2 | 12/2008 | Malik |
| 7,483,969 B2 | 1/2009 | Chavda et al. |
| 7,526,563 B2 | 4/2009 | Ingimundarson et al. |
| 7,561,041 B2 | 7/2009 | Nguyen et al. |
| 7,571,207 B2 | 8/2009 | Yoshizawa et al. |
| 7,587,457 B2 | 9/2009 | Fujibayashi |
| 7,624,172 B1 | 11/2009 | Austin-Lane |
| 7,650,337 B2 | 1/2010 | Cox |
| 7,668,911 B2 | 2/2010 | Miyata et al. |
| 7,676,550 B1 | 3/2010 | Jachner |
| 7,701,925 B1 | 4/2010 | Mason et al. |
| 7,702,726 B1 | 4/2010 | Grabelsky et al. |
| 7,765,265 B1* | 7/2010 | Granito ................ G06Q 10/107 707/999.003 |
| 7,836,126 B2 | 11/2010 | Thommes et al. |
| 7,844,667 B2 | 11/2010 | Ito et al. |
| 7,882,235 B2 | 2/2011 | Yumoto et al. |
| 7,953,811 B2 | 5/2011 | Ito et al. |
| 7,956,739 B2 | 6/2011 | Hong et al. |
| 8,090,821 B2 | 1/2012 | Holt et al. |
| 8,095,603 B2 | 1/2012 | Hung et al. |
| 8,108,345 B2 | 1/2012 | Cox et al. |
| 8,316,117 B2 | 11/2012 | Nguyen et al. |
| 8,370,756 B2 | 2/2013 | Malik et al. |
| 8,707,188 B2 | 4/2014 | Malik |
| 8,718,253 B2* | 5/2014 | Sharland ............. H04L 12/1822 379/158 |
| 2002/0026483 A1 | 2/2002 | Isaacs et al. |
| 2002/0032740 A1 | 3/2002 | Stern et al. |
| 2002/0035605 A1 | 3/2002 | McDowell et al. |
| 2002/0046299 A1 | 4/2002 | Lefeber et al. |
| 2002/0083127 A1 | 6/2002 | Agrawal |
| 2002/0103008 A1 | 8/2002 | Rahn et al. |
| 2002/0160757 A1 | 10/2002 | Shavit et al. |
| 2003/0050986 A1 | 3/2003 | Matthews et al. |
| 2003/0065788 A1 | 4/2003 | Salomaki |
| 2003/0097485 A1 | 5/2003 | Horvitz et al. |
| 2003/0182428 A1 | 9/2003 | Li et al. |
| 2003/0018903 A1 | 10/2003 | Greca et al. |
| 2003/0217098 A1 | 11/2003 | Bobde et al. |
| 2003/0217142 A1 | 11/2003 | Bobde et al. |
| 2003/0218631 A1 | 11/2003 | Malik |
| 2004/0003046 A1 | 1/2004 | Grabelsky et al. |
| 2004/0015547 A1 | 1/2004 | Griffin et al. |
| 2004/0015548 A1 | 1/2004 | Lee |
| 2004/0044738 A1 | 3/2004 | Ohno et al. |
| 2004/0085205 A1 | 5/2004 | Yeh |
| 2004/0086093 A1 | 5/2004 | Schranz |
| 2004/0153506 A1 | 8/2004 | Ito et al. |
| 2004/0171396 A1 | 9/2004 | Carey et al. |
| 2004/0177118 A1 | 9/2004 | Mason et al. |
| 2004/0177134 A1 | 9/2004 | Lonnfors et al. |
| 2004/0179038 A1 | 9/2004 | Blattner et al. |
| 2004/0179039 A1 | 9/2004 | Blattner et al. |
| 2004/0205175 A1 | 10/2004 | Kammerer |
| 2004/0221224 A1 | 11/2004 | Blattner et al. |
| 2004/0267887 A1 | 12/2004 | Berger et al. |
| 2004/0267939 A1 | 12/2004 | Yumoto et al. |
| 2005/0010644 A1 | 1/2005 | Brown et al. |
| 2005/0068167 A1 | 3/2005 | Boyer et al. |
| 2005/0086211 A1* | 4/2005 | Mayer ............... G06F 17/30864 |
| 2005/0138129 A1 | 6/2005 | Adamczyk et al. |
| 2005/0166154 A1 | 7/2005 | Wilson et al. |
| 2005/0210104 A1 | 9/2005 | Torvinen |
| 2005/0216565 A1 | 9/2005 | Ito et al. |
| 2005/0216595 A1 | 9/2005 | Miyata et al. |
| 2005/0218206 A1 | 10/2005 | Ohno et al. |
| 2005/0228895 A1 | 10/2005 | Karrunamurthy et al. |
| 2005/0251557 A1 | 11/2005 | Yoshizawa et al. |
| 2006/0004924 A1 | 1/2006 | Trossen |
| 2006/0030264 A1 | 2/2006 | Morris |
| 2006/0031293 A1 | 2/2006 | Thommes et al. |
| 2006/0031772 A1 | 2/2006 | Valeski |
| 2006/0064473 A1 | 3/2006 | Borella et al. |
| 2006/0112177 A1 | 5/2006 | Barkley et al. |
| 2006/0167998 A1 | 7/2006 | Yoshiuchi et al. |
| 2006/0242238 A1 | 10/2006 | Issa |
| 2006/0248184 A1 | 11/2006 | We et al. |
| 2006/0252444 A1 | 11/2006 | Ozugur |
| 2006/0253593 A1 | 11/2006 | Jachner |
| 2006/0277296 A1 | 12/2006 | Matsubara et al. |
| 2007/0016649 A1 | 1/2007 | Nishiki |
| 2007/0027930 A1 | 2/2007 | Alvarado et al. |
| 2007/0078965 A1 | 4/2007 | Shimamura et al. |
| 2007/0083627 A1 | 4/2007 | Mohammed et al. |
| 2007/0121867 A1 | 5/2007 | Ozgur et al. |
| 2007/0124469 A1 | 5/2007 | Mohammed et al. |
| 2007/0136475 A1 | 6/2007 | Leppisaari et al. |
| 2007/0143415 A1 | 6/2007 | Daigle |
| 2007/0143417 A1 | 6/2007 | Daigle |
| 2007/0150825 A1 | 6/2007 | Jachner |
| 2007/0182541 A1 | 8/2007 | Harris et al. |
| 2007/0198725 A1 | 8/2007 | Morris |
| 2007/0208702 A1 | 9/2007 | Morris |
| 2007/0220143 A1 | 9/2007 | Lund et al. |
| 2007/0233854 A1 | 10/2007 | Bukovec et al. |
| 2007/0239866 A1* | 10/2007 | Cox ..................... H04L 67/24 709/224 |
| 2007/0265859 A1 | 11/2007 | Jachner |
| 2008/0005294 A1 | 1/2008 | Morris |
| 2008/0077685 A1 | 3/2008 | Nguyen et al. |
| 2008/0125153 A1 | 5/2008 | Malik |
| 2008/0133708 A1 | 6/2008 | Alvarado et al. |
| 2008/0183866 A1 | 7/2008 | Maeda et al. |

(56) References Cited

U.S. PATENT DOCUMENTS

| | | |
|---|---|---|
| 2008/0184136 A1 | 7/2008 | Malik |
| 2008/0201419 A1 | 8/2008 | Hung et al. |
| 2008/0209347 A1 | 8/2008 | Malik et al. |
| 2008/0235230 A1* | 9/2008 | Maes .................... H04M 7/006 |
| 2008/0244026 A1 | 10/2008 | Holt et al. |
| 2009/0055526 A1 | 2/2009 | Mikami et al. |
| 2009/0094330 A1 | 4/2009 | McQuaide et al. |
| 2009/0138566 A1 | 5/2009 | Ito et al. |
| 2009/0254627 A1 | 10/2009 | Morris |
| 2009/0307349 A1 | 12/2009 | Harris et al. |
| 2010/0114579 A1 | 5/2010 | Ostermann et al. |
| 2010/0185677 A1* | 7/2010 | Gupta .................... G06Q 10/10 707/784 |
| 2010/0219971 A1 | 9/2010 | Appelman et al. |
| 2010/0227594 A1 | 9/2010 | De Vries |
| 2010/0299385 A1 | 11/2010 | Root et al. |
| 2010/0299615 A1 | 11/2010 | Miluzzo et al. |
| 2011/0029629 A1 | 2/2011 | Burtner et al. |
| 2011/0078271 A1 | 3/2011 | Ito et al. |
| 2011/0093601 A1 | 4/2011 | Yumoto et al. |

OTHER PUBLICATIONS

Boyer, et al.; "Presence Awareness Tools for Virtual Enterprise", 1998, Virtual Enterprise Workshop, Citeseer, pp. 1-6.

Business Communications Review; "Why Unified Communications Needs Presence Federation: Vendor Reluctance and Incomplete Standards are Preventing the Free Sharing of Presence Information, and the Full Utility of Unified communications", Publication Date: Dec. 1, 2006; pp. 1-3.

CISCO; "Interdomain Federation—Enable Business-to-Business Exchange of Cisco and Microsoft Presence and IM", Cisco Systems, Inc.; 2009; pp. 1-10.

Rosenberg, et al.; "Models for Intra-Domain Presence and Instant Messaging (IM) Bridging", Internet-Draft, Mar. 9, 2009; pp. 1-47.

Borjesson; "Presence Federation Across Multiple SIP Domains", Oracle Corporation, Jun. 2007, pp. 1-10.

* cited by examiner

AGGREGATED PRESENCE OVER USER FEDERATED DEVICES

This application is a continuation of prior U.S. patent application Ser. No. 12/535,062 filed Aug. 4, 2009, the disclosure of which is herein incorporated by reference in its entirety.

TECHNICAL FIELD

The present disclosure is generally related to computer networks and, more particularly, is related to communicating statuses of networking devices and users.

BACKGROUND

To update presence information across multiple messaging platforms, such as telephony and instant messaging, often a client user individually updates his or her presence status on the individual messaging platforms. For example, the client user may set an "Out of Office" presence state on an email messaging platform and an offline network status on an instant messaging platform. Therefore, users that wish to provide presence updates spend a great deal of time manually configuring each messaging platform device or service separately.

SUMMARY

One embodiment of a system for aggregating and distributing presence information comprises a hosted presence aggregator server. The hosted presence aggregator server receives an update of presence information from a user device and relays the presence information update to another user device, wherein the user devices are part of a federation of user devices controlled by a single user which relay updates in presence status of the single user to one another via the hosted presence aggregator server.

One embodiment of a method for aggregating and distributing presence information comprises receiving an update of presence information from a user device and relaying the presence information update to another user device, wherein the user devices are part of a federation of user devices controlled by a single user which relay updates in presence status of the single user to one another.

One embodiment of a computer readable medium has computer instructions for aggregating and distributing presence information, where the computer instructions when executed by one or more computers cause the one or more computers to receive an update of presence information from a user device and relay the presence information update to another user device, wherein the user devices are part of a federation of user devices controlled by a single user which relay updates in presence status of the single user to one another.

Other systems, methods, articles, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure provide systems and methods to connect non-interoperable messaging platforms to update primary presence status for platform users which may include updates across multiple messaging devices and/or services (e.g., cellular phone voicemail, office voicemail, enterprise email, instant messaging, web based email). Embodiments of the present disclosure may provide systems and methods of interoperability to update key presence information across multiple types of messaging platforms, including telephony, email, instant messaging, etc.

Embodiments of the present disclosure, among others, provide an ability to interconnect non-contiguous messaging, internet protocol (IP), and telephony platforms to provide automated presence updates that affect a single user.

This includes information on how to reach a user that is away from his or her messaging or user device (e.g. email, mobile cellular telephone, IP-based office telephone). This is interoperable with known industry standards for recording and setting presence information. This includes multiple protocol stacks across different types of devices, such as but not limited to session initiation protocol (SIP), session initiation protocol for instant messaging and presence leveraging extensions (SIMPLE), voice extensible markup language (VXML), telephony application programming interface (TAPI), JABBER®, and extensible messaging and presence protocol (XMPP).

Figure 1:
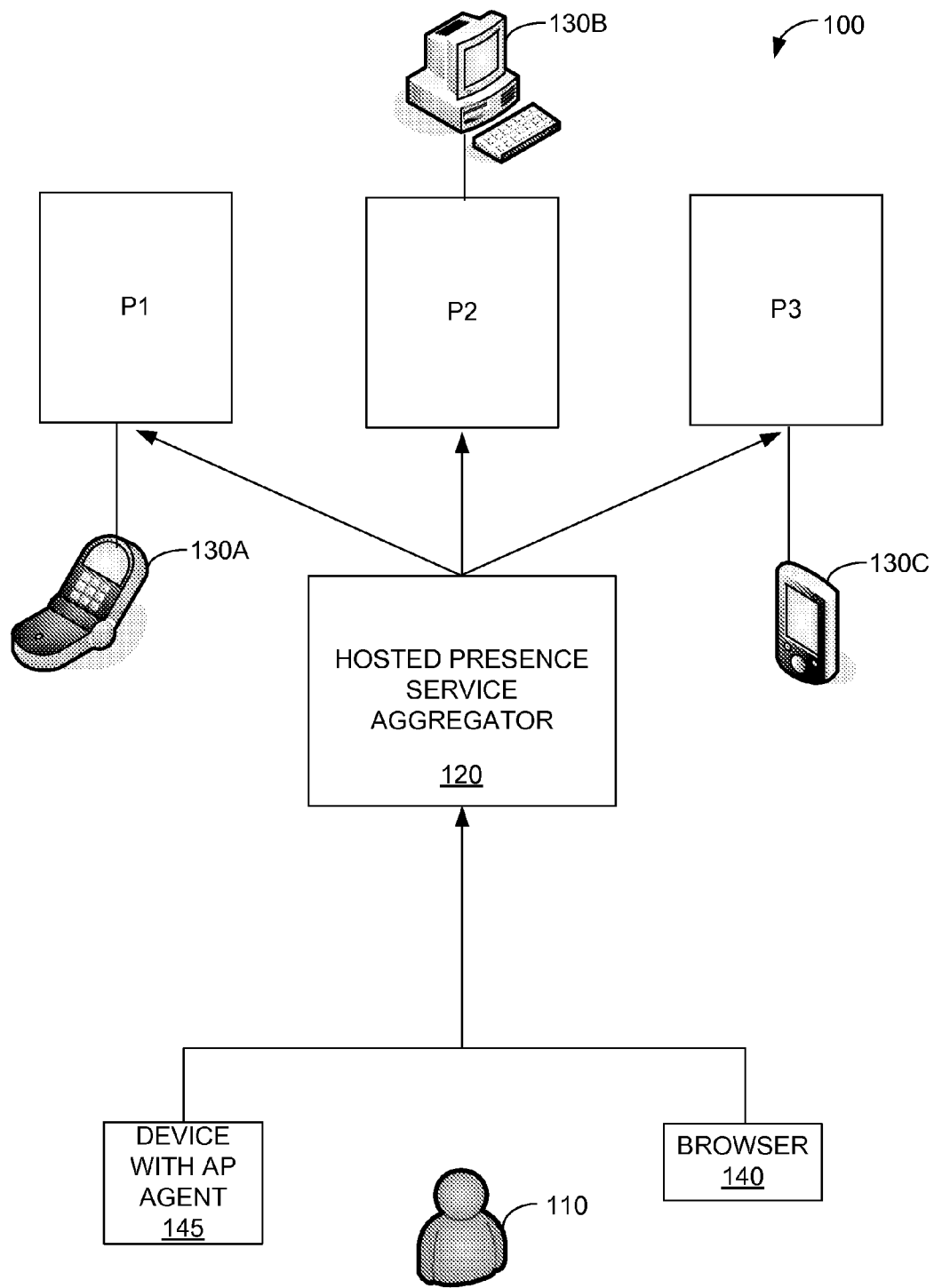
FIG. 1 is a system diagram of one embodiment of an aggregated presence system in accordance with the present disclosure.

Referring now to FIG. 1, a system diagram of one embodiment of an aggregated presence system 100 is shown. Via this system, a user does not have to update presence information on multiple messaging platforms P1, P2, P3 with separate presence configuration to provide information regarding his or her current presence status, where the presence status generally indicates or conveys an ability and willingness of the user to communicate. Specifically, a user may not need to individually alter a user's Office and Home voicemail box primary greeting, email platform "Out Of The Office" information, and instant messaging client presence information. Rather, a hosted presence aggregator 120 allows presence updates to be relayed to mutually non-connected entities securely using a web browser 140 or an aggregated presence (AP) agent 145 installed at an end messaging or user device 130A, 130B, 130C. The hosted presence aggregator 120 supports both voice and text presence information and audio recordings from a single location.

Using the AP agent application 145 on a user's messaging device, the user can federate the messaging device to a central point or site (e.g., hosted presence aggregator site). The central hosted presence aggregator site may then push down presence updates and policies to federated devices 130A, 130B, 130C of the user 110. Each of the devices in the user's federation will be updated with presence information provided to the central point or site. For example, the user may make a presence update once to the hosted presence aggregator 120 which will then relay the update to the user's phone 130A and computer 130B at the same or nearly the same time. In one embodiment, the AP agent application 145 on the user's cell phone may poll the hosted presence aggregator 120 for new updates and the hosted presence aggregator 120 may communicate the requested presence updates to the AP agent application 145 so that they may be made on a federated device 130A, 130B, 130C. Similarly, the user's phone may not feature memory and processing capabilities and may utilize processing capabilities of a server so that the AP agent 145 resides on the server and sets the presence updates relayed from the hosted presence aggregator 120. In one embodiment, the presence update may constitute an outgoing message for a voicemail box of the user that is provided to the hosted presence aggregator 120 and relayed to participating federated devices 130 capable of utilizing the update. In accordance with the presence disclosure, federated messaging devices 130 which communicate with the hosted presence aggregator are not intended to be limited to devices having a same provider, vendor, or carrier. Therefore, messaging devices may be federated for a user which are not normally connectable but may connect to a central point and receive presence updates so that the devices may be managed.

Figure 2:
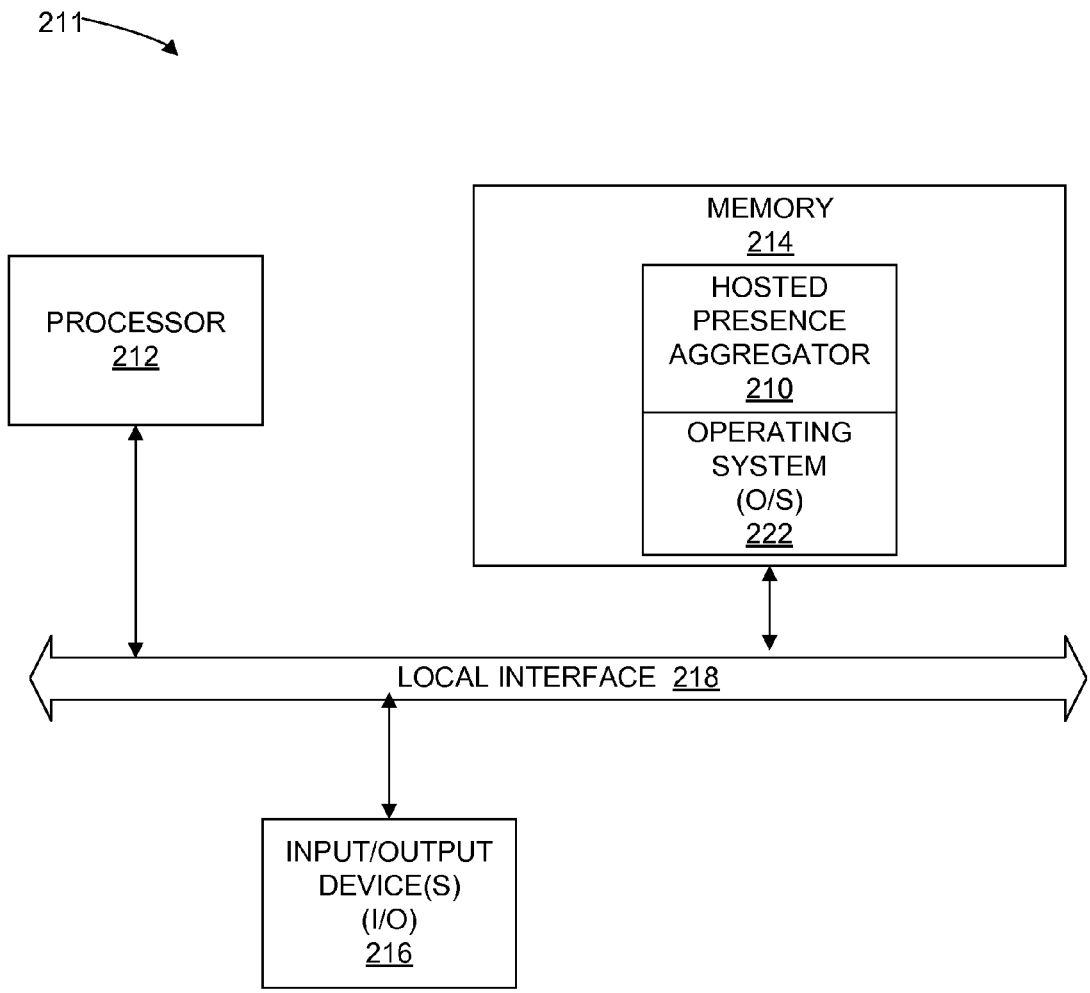
FIG. 2 is a block diagram of one embodiment of a computer implementing a hosted presence aggregator component of FIG. 1.

The hosted presence aggregator 120 component of one embodiment of the disclosure can be implemented in software (e.g., firmware), hardware, or a combination thereof. In one mode, the hosted presence aggregator component 120 is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the hosted presence aggregator component is shown in FIG. 2. In FIG. 2, the hosted presence aggregator component is denoted by reference numeral 210.

Generally, in terms of hardware architecture, as shown in FIG. 2, the computer 211 includes a processor 212, memory 214, and one or more input and/or output (I/O) devices 216 (or peripherals) that are communicatively coupled via a local interface 218. The local interface 218 can be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 212 is a hardware device for executing software, particularly that stored in memory 214. The processor 212 can be any custom made or commercially available processor, a central processing unit (CPU), an auxiliary processor among several processors associated with the computer 211, a semiconductor based microprocessor (in the form of a microchip or chip set), a macroprocessor, or generally any device for executing software instructions.

The memory 214 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the processor 212.

The software in memory 214 may include one or more separate programs, each of which comprises an ordered listing of executable instructions for implementing logical functions. In the example of FIG. 2, the software in the memory 214 includes the hosted presence aggregator component in accordance with an embodiment of the present disclosure and a suitable operating system (O/S) 222. The operating system 222 controls the execution of other computer programs, such as the hosted presence aggregator component 210, and provides scheduling, input-output control, file and data management, memory management, and communication control and related services.

The hosted presence aggregator component 210 is a source program, executable program (object code), script, or any other entity comprising a set of instructions to be performed. When a source program, then the program needs to be translated via a compiler, assembler, interpreter, or the like, which may or may not be included within the memory 214, so as to operate properly in connection with the O/S 222. Furthermore, the hosted presence aggregator component 210 can be written as (a) an object oriented programming language, which has classes of data and methods, or (b) a procedure programming language, which has routines, subroutines, and/or functions.

The I/O devices 216 may include input devices, for example but not limited to, a keyboard, mouse, scanner, microphone, etc. Furthermore, the I/O devices 216 may also include output devices, for example but not limited to, a printer, display, etc. Finally, the I/O devices 216 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The software in the memory 214 may further include a basic input output system (BIOS) (omitted for simplicity). The BIOS is a set of software routines that initialize and test hardware at startup, start the O/S 222, and support the transfer of data among the hardware devices. The BIOS is stored in ROM so that the BIOS can be executed when the computer 211 is activated.

When the computer 211 is in operation, the processor 212 is configured to execute software stored within the memory 214, to communicate data to and from the memory 214, and to generally control operations of the computer 211 pursuant to the software. The hosted presence aggregator component 210 and the O/S 222, in whole or in part, but typically the latter, are read by the processor 212, perhaps buffered within the processor 212, and then executed.

When the hosted presence aggregator component 210 is implemented in software, as is shown in FIG. 2, it should be noted that the hosted presence aggregator component 210 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The computer readable medium can be, for example but not limited to, an electronic, magnetic, optical, electromagnetic, infrared, or semiconductor system, apparatus, device, or medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM)(optical).

In an alternative embodiment, where the hosted presence aggregator component 210 is implemented in hardware, the hosted presence aggregator component can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
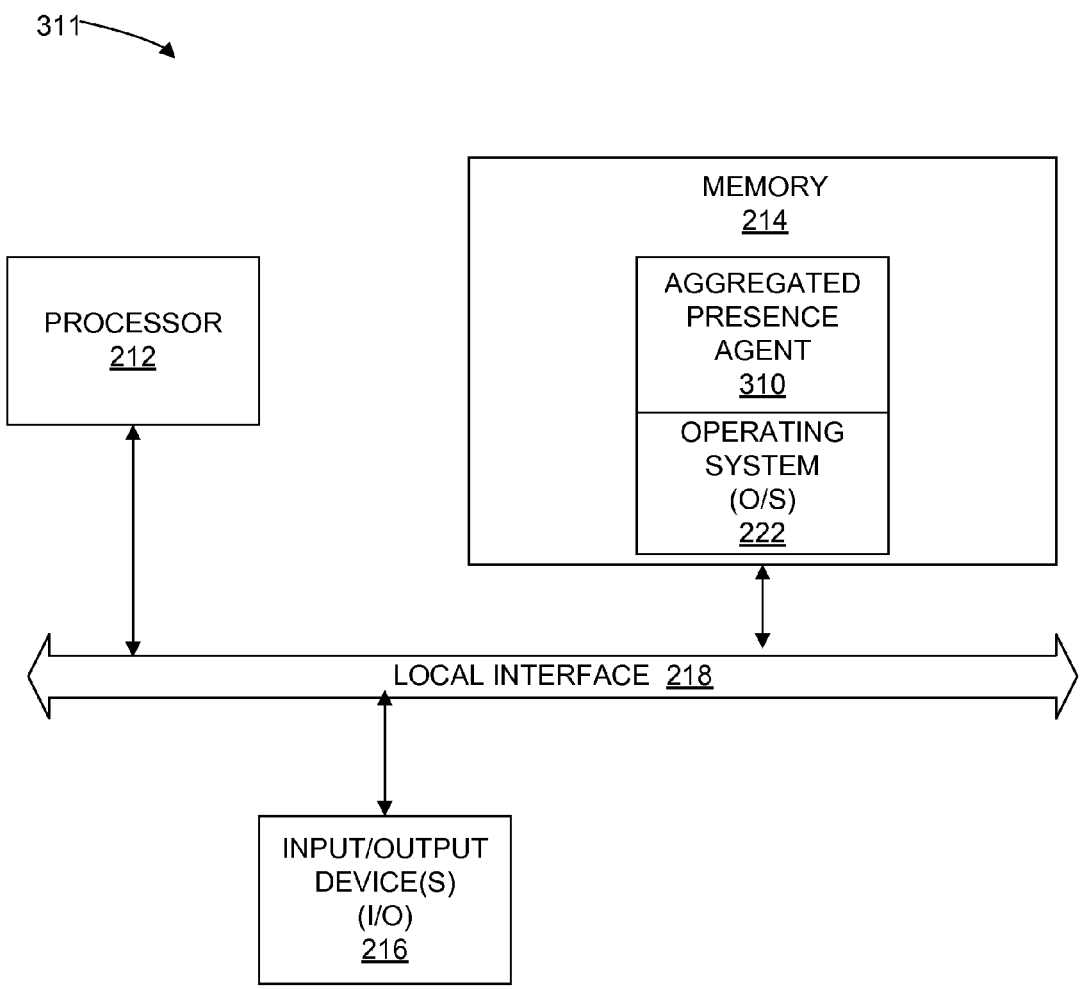
FIG. 3 is a block diagram of one embodiment of a computer implementing an aggregated presence component of FIG. 1.

Similarly, the AP agent component of one embodiment of the disclosure can be implemented in software (e.g., firmware), hardware, or a combination thereof. In one mode, the AP agent component is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer 311 that can implement the AP agent component is shown in FIG. 3. In FIG. 3, the AP agent component is denoted by reference numeral 310. The rest of the components shown in the figure are similar to the components just described for FIG. 2.

Messaging platform provided services may include cellular phone voicemail, office voicemail, enterprise email, instant messaging, and Web based email. As stated above, a user does not have to update presence information on multiple platforms with separate presence configuration to provide information regarding their current status. A user can access the hosted presence aggregator service using web communications or communications from an AP agent 145 installed on an end messaging device. Accordingly, a web browser 140 may be used by the user to access a web service provided by the hosted presence aggregator service. Therefore, the hosted presence aggregator 120 is hosted on a web server, in one embodiment.

When accessing the hosted presence aggregator service using a web browser 140, a user-interface web page is displayed on the computing device hosting the web browser 140. Via the user-interface, a user can update his or her presence information. After receiving the presence information update for the user, the hosted presence aggregator service establishes updates to all user-owned or user-controlled information services. With aid of a web user interface, the hosted presence aggregator manages and publishes different presence data schemas, including text status, GPS (Global Positioning System) coordinates, and audio, image, and video data.

As an example, in one embodiment, a user may update his or her presence information using a web browser. In this example, the web browser may display a web page provided by the hosted presence aggregator service. The web page may include a user interface for selecting or inputting a presence status for the user and relaying this presence status to the hosted presence aggregator service. After receiving the updated presence status for the user, the hosted presence aggregator 120 may then provide the updated presence status to other devices and services owned or controlled by the user, so that these devices and services may update their presence information for the user. Accordingly, a federation of presence enabled devices and services 130 for a single user may be established.

Further, in one embodiment, the user may update his or her presence status using a user interface provided on a user messaging device, such as the user's mobile phone or IM (instant messaging) client device. In accordance with the present disclosure, the user messaging device may also host an AP agent 145 which detects the change in or updating of presence status and relays the new presence information to the hosted presence aggregator 120.

Figure 4:
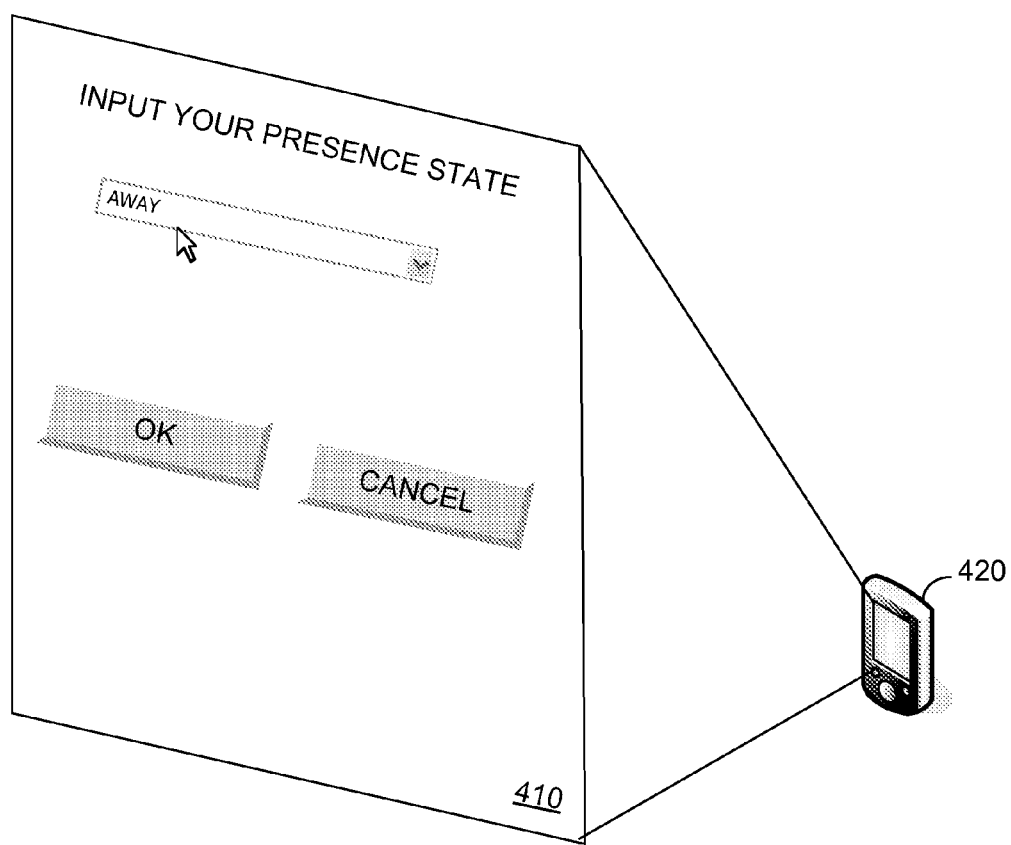
FIG. 4 is a diagram of one embodiment of a user interface that can be used to indicate a user's presence state within the system of FIG. 1.

Referring now to FIG. 4, one embodiment of a user interface 410 for indicating a user's presence state for a messaging device 420 is shown. In this example, a user interface 410 to a messaging device 420 allows a user to select a presence state. After selection of the presence state, the AP agent 145 installed on the messaging device 420 relays the selected presence state to the hosted presence aggregator component 120.

Figure 5:
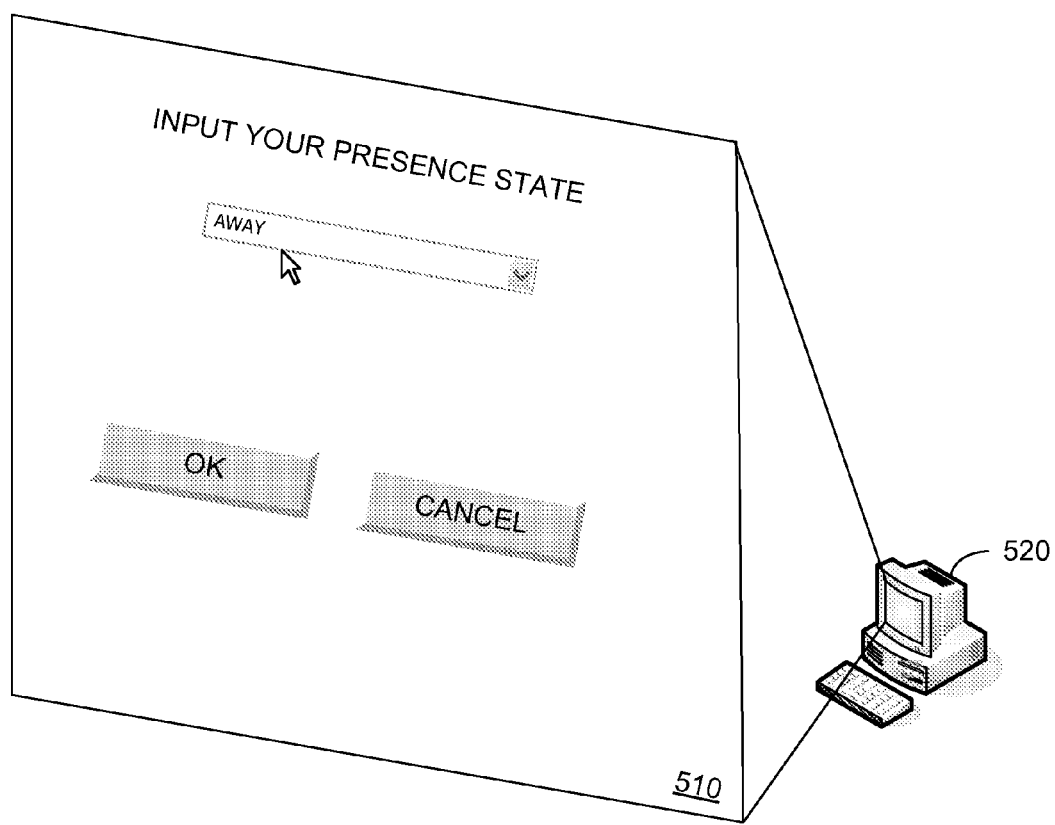
FIG. 5 is a diagram of one embodiment of a user interface of a web browser that can be used to indicate a user's presence state within the system of FIG. 1.

Similarly, referring now to FIG. 5, one embodiment of a user interface for indicating a user's presence state for a web browser 140 is shown. In this example, a user interface 510 comprising a web page displayed on a computer 520 hosting the web browser 140 allows a user to select a presence state. Selection of the presence state is communicated to the hosted presence aggregator component 120 using HTTP (hypertext transfer protocol) communications.

After receiving the updated presence status for the user, the hosted presence aggregator 120 may then provide the updated presence status to other devices and services 130 owned or controlled by the user 110, so that these devices and services may update their presence information for the user.

In one embodiment, an update in presence information may be indicated by uploading an outgoing message announcement to the hosted presence aggregator 120, such as that used in voicemail systems to indicate that a user is away from his or her messaging service or device. After receiving the updated presence information, the outgoing message announcement may be relayed to the user's owned or controlled services that can utilize the updated information, such as the user's voicemail services.

In one embodiment, the devices and services receiving the updated presence information may poll the hosted presence aggregator service for new updates, if available. Otherwise, in some embodiments, the hosted presence aggregator 120 pushes new updates to the devices and services. Presence status can also be exported to Web 2.0 enabled social networking sites including MYSPACE®, TWITTER®, LINKEDIN®, and FACEBOOK®. To designate such sites, the user may specify them and corresponding usernames and passwords, if necessary, with the hosted presence aggregator service. The hosted presence aggregator service understands presence types utilized by different and individual presence devices/services, including "away for travel," "out of office, " etc. and may translate terms used by one device/service into terms used by the hosted presence aggregator 120 and vice versa. In general, the hosted presence aggregator 120 is technology agnostic using connectors for presence protocols, including XML, SIP, SIMPLE, VXML, TAPI, XMPP, JABBER®, MICROSOFT EXCHANGE®, etc. and is interoperable with known industry standards for recording and setting presence information.

Once a user has federated his or her messaging devices (or other devices that utilize presence updates) and has established presence updates from a central point, the user can then establish act-on behavior for the federated devices in response to the user's presence information. The act-on behavior entails how a federated device is to act in response to certain presence information. Accordingly, once a user has established a federation and established a presence update, the act-on behavior determines what is actually done with the presence data to make it usable either than simply providing the presence data to someone or device. For example, if someone in the user's friends group calls one of one of the user's federated devices and the user's presence is that of being away or unavailable, as a non-limiting example, the federated device may have been provided a policy describing the desired act-on behavior for responding to a call from one of the user's friends while the user is "away." This policy may state that GPS information on the user's location is to be provided to the friend. This GPS information may be obtained from a user's federated device itself. Alternatively, the GPS information may be relayed to the hosted presence aggregator 120 from a user or messenger device and then relayed to a federated device upon request by the device. Alternatively, a policy could state to provide a string of data (e.g., "I'm on vacation"), provide a hypertext map link that can be clicked and viewed, etc.

While the prior example describes an ability to use act-on policy data intelligently with GPS integration, in some embodiments, a hosted web-based platform may be extended to include XML metadata which will enable it to easily support new data types for act-on and notification behavior as a hosted web service. This is useful as communication evolves beyond telephone devices into network driven unified communications clients and other types of network connected devices. As an example, high priority calls could have presence act-on behavior for a manager that are routed into a receptionist IM alert; alternately it could be displayed as in-dash messaging from a Bluetooth-capable mobile phone or be presented as a video stream to their AT&T U-Verse® television receiver at office and at home. Further, package shipping services may use hosted federated presence GPS information from a mobile phone to determine the current location to route a postal parcel in the event that a user is traveling on business or on vacation such that the user can request a reroute of a package in transit and then chose to share the presence data with the postal carrier if the shipping company's tracking web site is presence enabled. Other types of devices not specifically mentioned in this disclosure could also be made presence aware that are associated directly to a user or user group presence updates. For example, video projector carts could send presence updates with information from their GPS tag so that they can be located for a presentation. Also, hospital crash carts could update presence information with their current floor, location, and in use status enabling more responsive emergency medical care. The foregoing are but illustrative examples and are not meant to be limiting.

As suggested above, in some embodiments, a hosted presence aggregator web platform 120 supplies act-on presence behavior to end user or messenger devices. For example, a user may specify a policy on how end user devices should act or behave for particular presence states or scenarios. Further, the user may establish groups of contacts such as a friends group, office group, all users group. Therefore, the user may establish a policy that specifies that when the user is "away" and receives attempted communications from another user that is not in his or her friends group that the end device that is receiving this communication should forward the communication to voicemail. Additional rules may be established such as automatically accepting a meeting request when the user is in a particular presence state. The policy rules may be relayed to each of the user's end devices 130 or rules may be specified to be for a particular device or device-type. For example, the user 110 may designate that when the user is "present and available" and receives attempted communications from another user on a "telephone" device that the call should be forwarded to his or her office telephone. Accordingly, different user devices may be associated with specific behaviors based on the type of presence set or states of a user. This includes information on how to reach a user that is away from his or her primary messaging device (e.g., email, mobile cellular telephone, IP-based office telephone).

Figure 6:
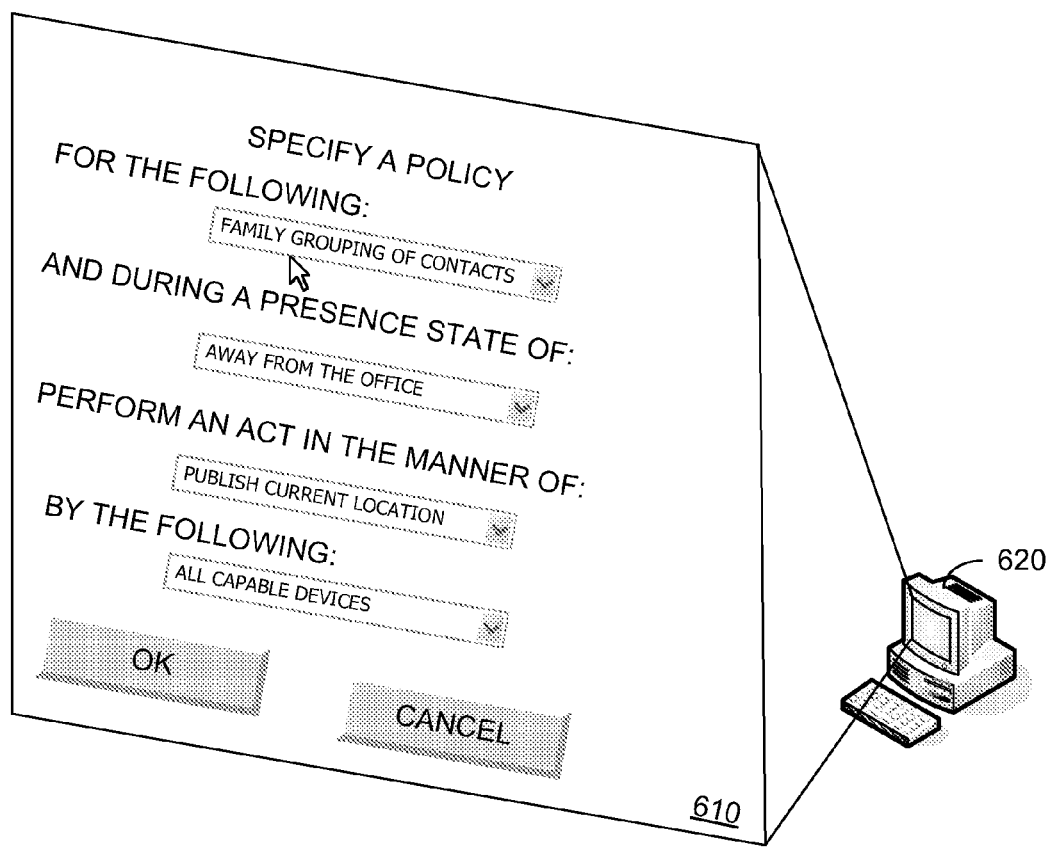
FIG. 6 is a diagram of one embodiment of a user interface that can be used to specify a policy to be utilized within the system of FIG. 1.

As shown in an example represented by FIG. 6, a user may configure a user-device to provide GPS coordinates to the hosted presence aggregator 120. In this example, a user interface 610 comprising a web page displayed on a computer 620 hosting the web browser 140 allows a user to designate a policy that is communicated to the hosted presence aggregator component 120 using HTTP (hypertext transfer protocol) communications. As depicted, the user may specify a policy that the user's current location (e.g., via GPS coordinates) should be provided or published to interested contacts in a "family" grouping when the user is "away from the office" so that these contacts may know the whereabouts of the user. Accordingly, the GPS coordinates may be provided by the hosted presence aggregator 120 to the user's end devices and then relayed to interested contacts that are attempting to contact the user via one of these end devices 130.

In one embodiment, a federation takes place using an AP agent application 145 that establishes a secure connection with a hosted presence aggregator 120. This secure connection is based on a certificate authenticating the device as part of an authorized federation. For example, in case of a cell phone or in the case of a computer (e.g., email or IM client), the AP agent application 145 is installed on the device and a certificate is generated or issued by the hosted presence aggregator service and sent to the device and installed.

The digital certificate acts as a digital credential that identifies a user device as being part of a valid federation. Accordingly, a digital certificate may be revoked from a device when the user or messaging device should no longer be part of a user's federation of devices, including messaging servers in one embodiment. For example, an employer may revoke a certificate of an employer's work phone being utilized by a user so that the user can not make presence changes for the work phone after the user's employment with the employer has terminated. In this case, the user's control or ownership of the work device has extinguished.

In one arrangement, among others, a chain of user and organization security certificates is supported as an "intermediary" group. This gives a user the authority to manage and publish presence updates on behalf of an organization or employer, fellow employee, or other user. The intermediary certificates can be revoked by the employer or other user to remove authorization to publish presence updates on their behalf. This is important if an employee leaves their employer, or loses physical access to the presence agent device (e.g., a mobile phone is stolen, home PC intrusion, etc.)

In one embodiment, a digital certificate utilizes public key cryptography by containing a public key of the user identified in the certificate. The certificate matches a public key to a particular user and that certificate's authenticity is guaranteed by the issuer.

Also, in some embodiments, the hosted presence aggregator platform securely authenticates and manages device state and synchronization using public key cryptography and PKI (public key infrastructure) certificate model for end to end encryption. In one embodiment, the hosted presence aggregator 120 encrypts communications intended for an end messaging device 130 of a user 110 with a public key of the end device, so that only a private key of the end device can decode the communications. Likewise, end devices may encrypt communications intended for the hosted presence aggregator 120 with a public key of the hosted presence aggregator 120 so that a private key (installed at the hosted presence aggregator) is needed to decode those communications.

Figure 7:
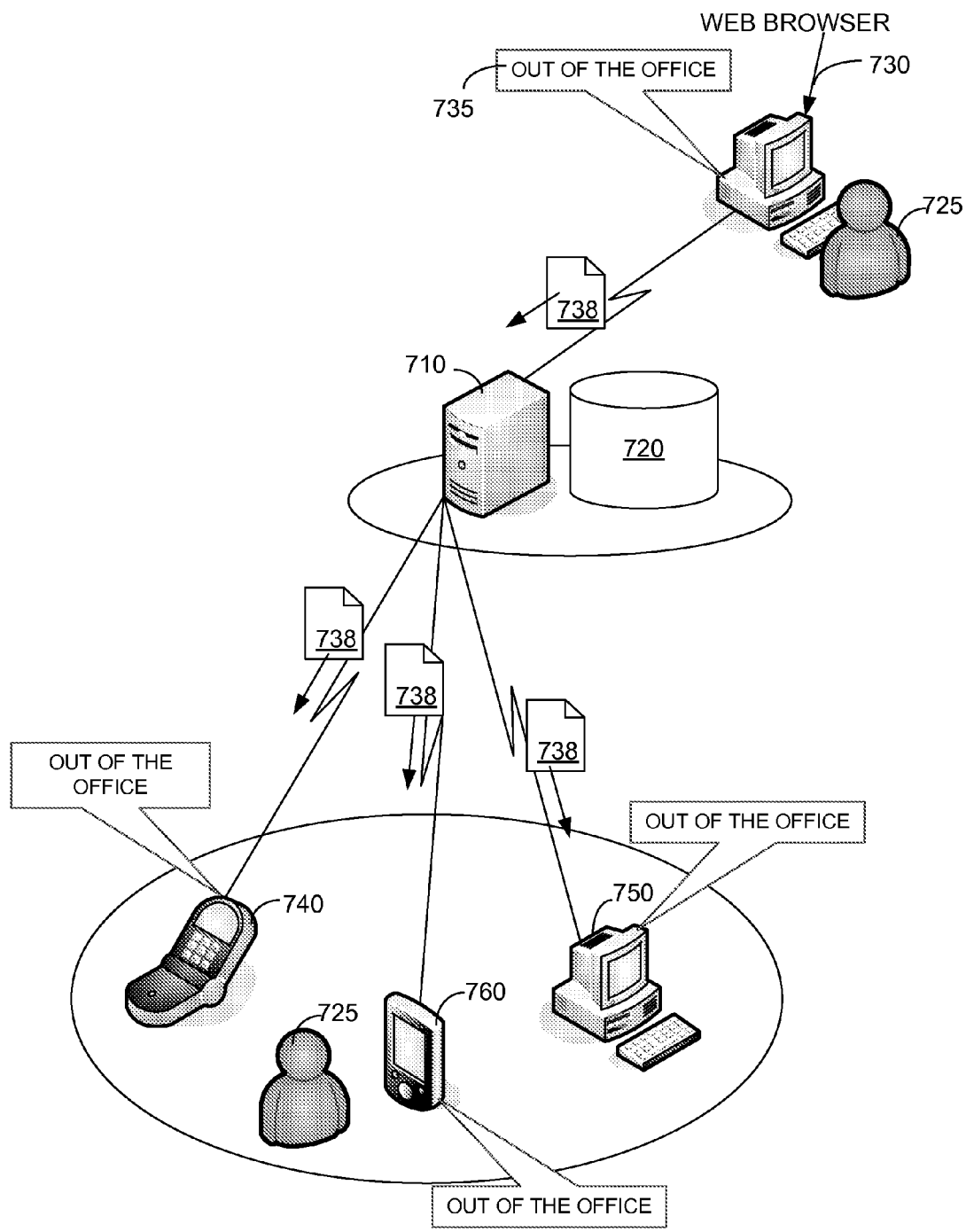
FIGS. 7-8 are system diagrams representing implementations of an embodiment of the system of FIG. 1, where presence information is being transmitted to a federation of user devices.

Referring now to FIG. 7, one embodiment of a presence federation system is shown. In this system, a hosted presence aggregator service is hosted on server 710 which is communicatively coupled to database 720. Database 720 stores presence profiles, policies, statuses, and related information utilized by the hosted presence aggregator service. As previously discussed, a user 725 may update his or her presence using a web browser 730 which communicates with the hosted presence aggregator service. In this example, the user has posted his or her presence as being "Out Of The Office" 735. The web browser 730 communicates the presence update 738 (e.g., using wireless or wired network communications) to the hosted presence aggregator 120 at server 710. The hosted presence aggregator service at server 710 may then push or transmit the presence update 738 (e.g., using wireless or wired network communications) to the user's federated devices, including a telephone 740, a personal computer 750 (and installed messaging applications), and a personal digital assistant 760.

Figure 8:
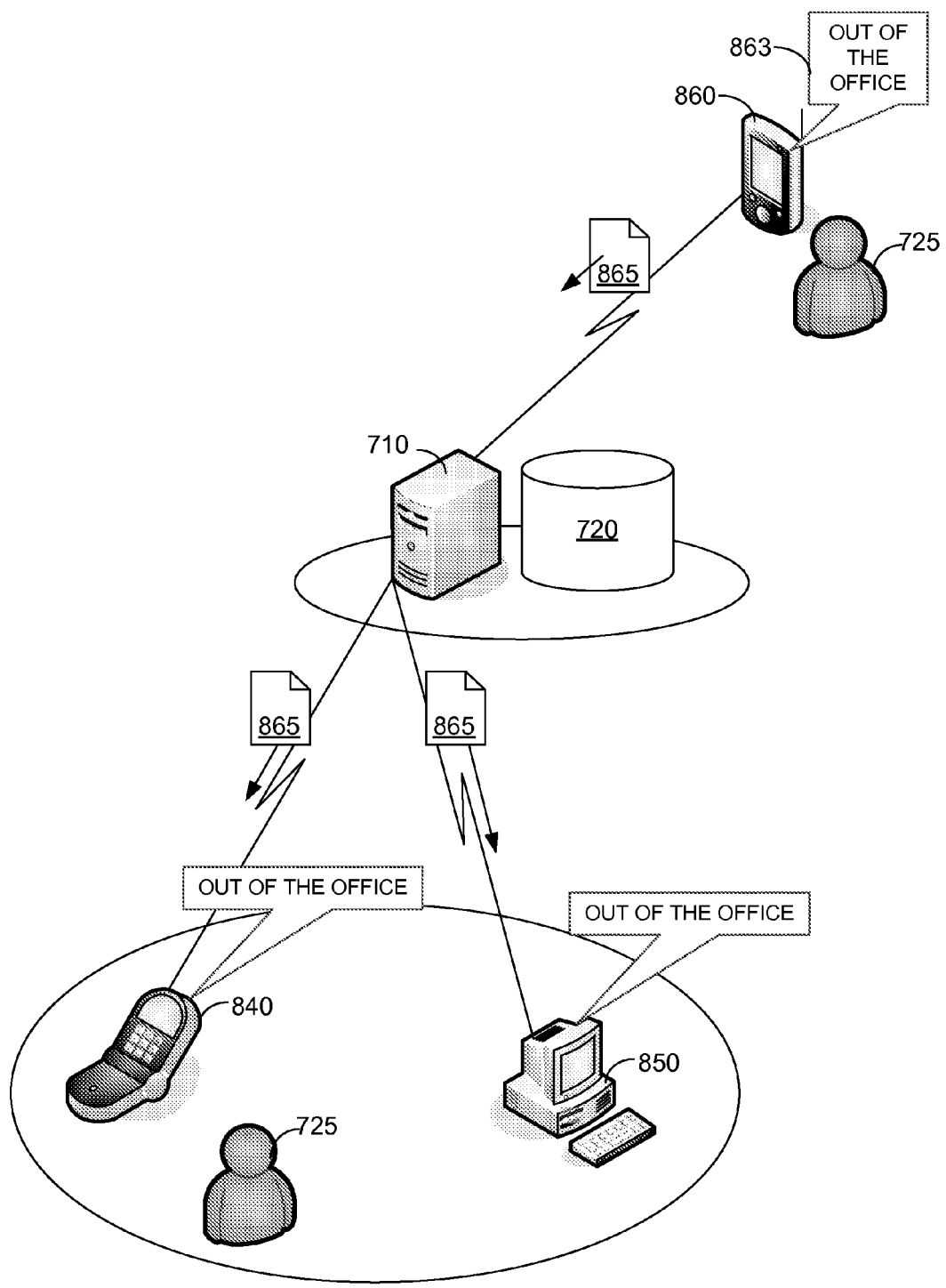

Referring now to FIG. 8, one embodiment of a presence federation system is shown where like components have similar numbers, as provided in FIG. 7. As previously discussed, a user 725 may update his or her presence using a personal messaging device, such as a personal digital assistant 860 installed with an AP agent application 145. In this example, the user has posted his or her presence as being "Out Of The Office" 863 on the messaging device 860 and the AP agent 145 detects the update and relays the presence information 865 to the hosted presence aggregator service 120 at server 710. The hosted presence aggregator service may then push or transmit the presence update 865 to the user's federated devices, including a telephone 840 and a personal computer 850 (and installed messaging applications).

Figure 9:
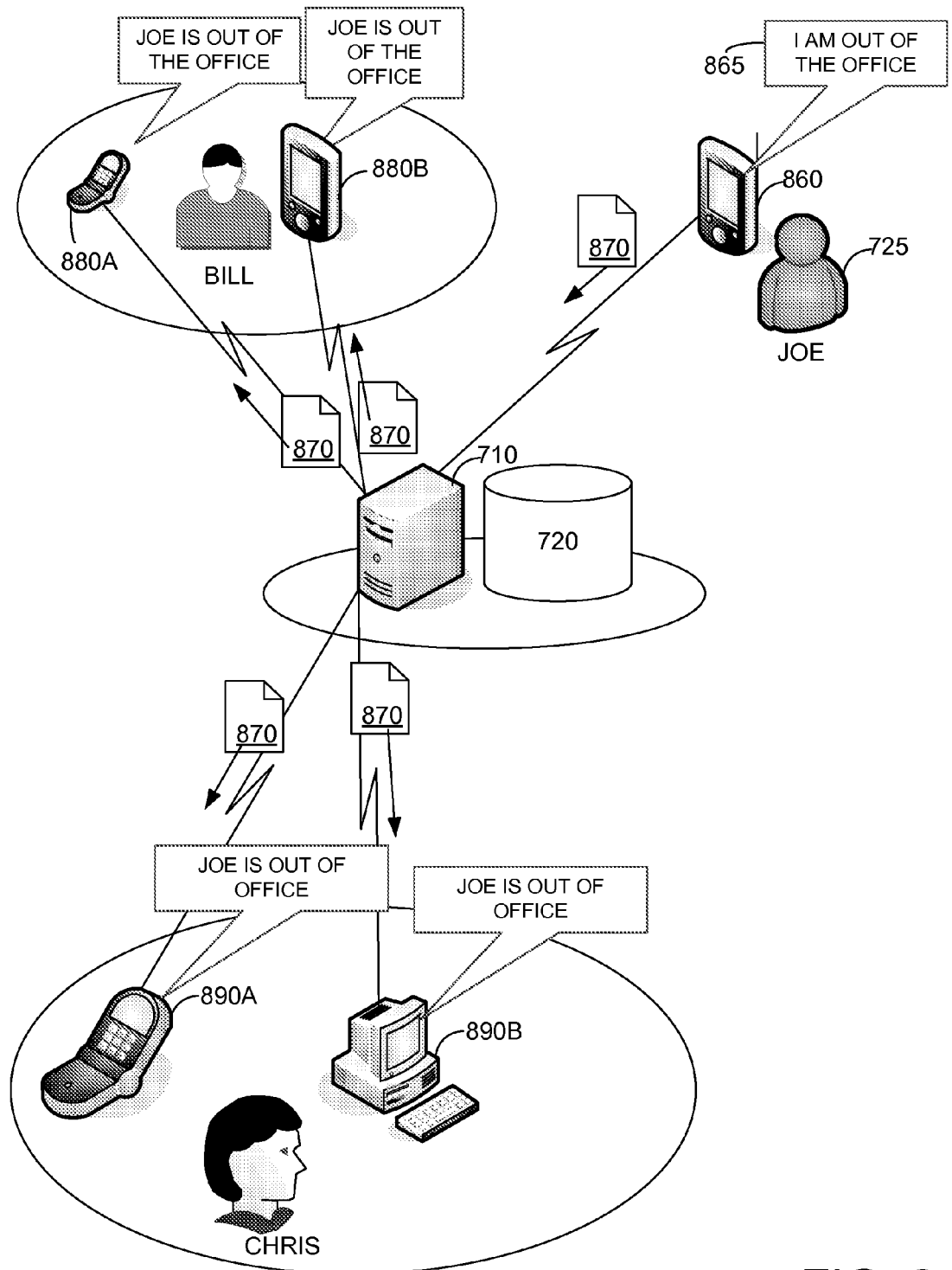
FIG. 9 is a system diagram representing one implementation of an embodiment of FIG. 1, where a user's presence information is being transmitted to other users.

In FIG. 9, one embodiment of a presence federation system is shown where like components have similar numbers, as provided in FIG. 7. As previously discussed, a user 725 may update his or her presence using a personal messaging device, such as a personal digital assistant 860 installed with an AP agent application 145. In this example, the user "Joe" 725 has posted his or her presence as being "Out Of The Office" 865 on the messaging device 860 and the AP agent 145 detects the presence update and relays the presence information 870 to the hosted presence aggregator service at server 710. The hosted presence aggregator service may then push or transmit the presence update 870 to the federated devices 880, 890 of other users in accordance with Joe's policy on how he or she would like his or her presence information to be published. In this example, Joe's policy indicates that presence updates should be distributed to user "Chris" and user "Bill" and all of their federated devices 880, 890.

Figure 10:
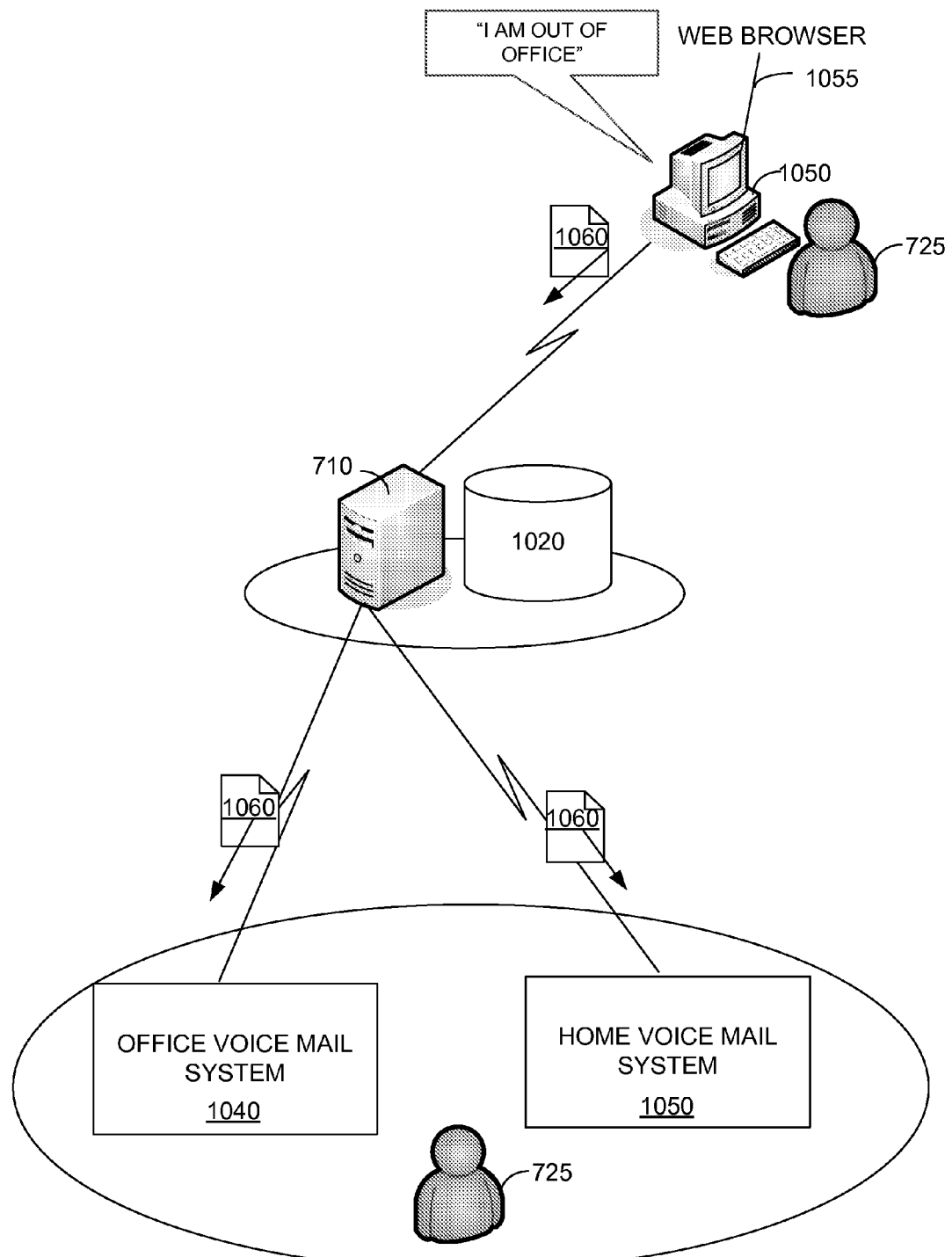
FIGS. 10-11 are system diagrams representing implementations of an embodiment of FIG. 1, where a user's presence information in the form of an audio recording is being transmitted to a federation of user devices.

Referring now to FIG. 10, one embodiment of a presence federation system is shown where like components have similar numbers, as provided in FIG. 7. Similar to database 720, database 1020 stores presence profiles, policies, statuses, and related information, such as media describing presence states, utilized by the hosted presence aggregator service at server 710. As previously discussed, a user 725 may update his or her presence using a personal messaging device, such as a personal computer 1050 installed with a web browser application 1055. In this example, the user has posted his or her presence as being "I Am Out Of The Office" by uploading a recorded audio message 1060 to the hosted presence aggregator service at server 710 from the web browser 1055. The hosted presence aggregator service may then push or transmit the uploaded recorded audio message 1060 to the user's federated voicemail services, including an office voicemail system 1040 and a home voicemail system 1050.

Figure 11:
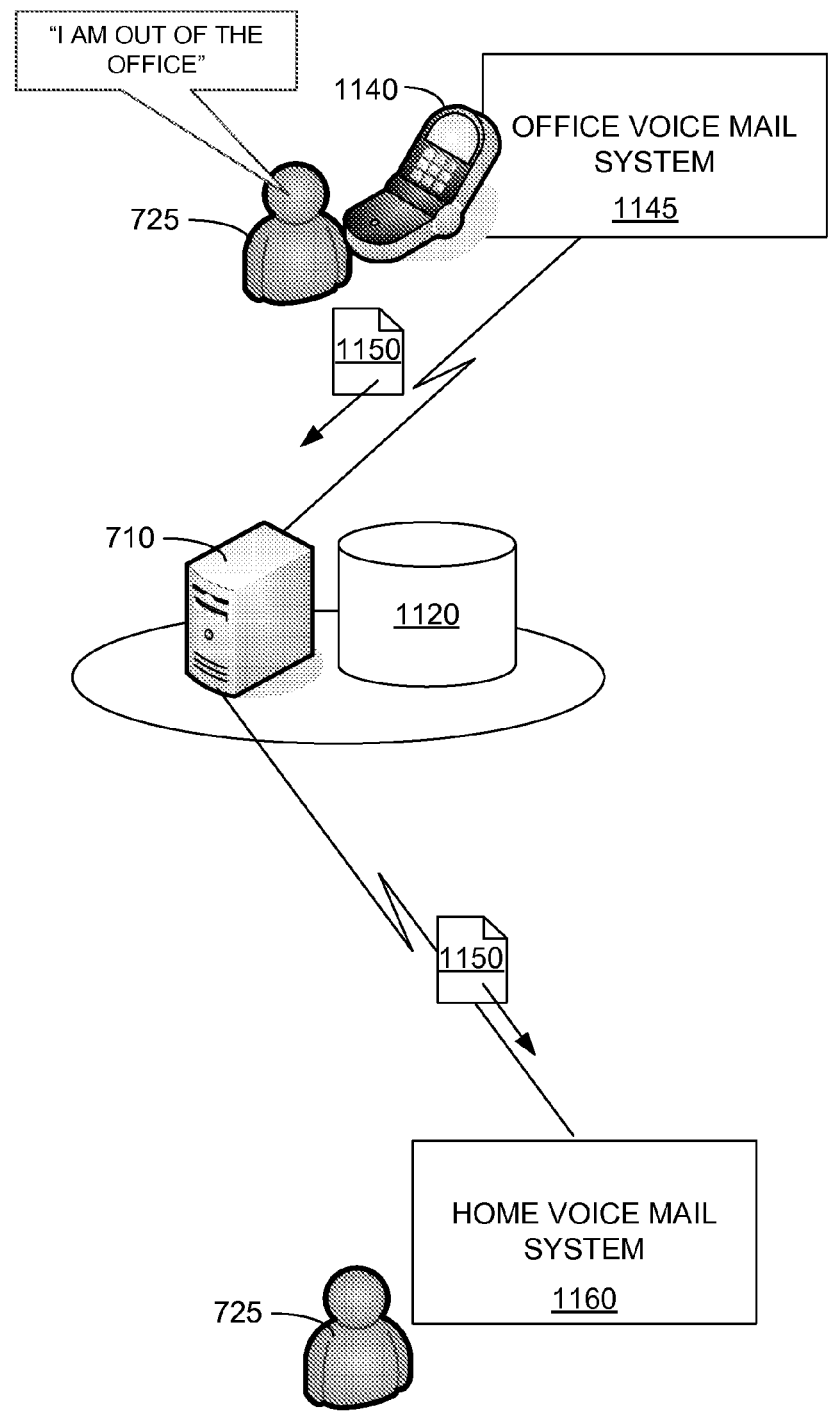

Referring now to FIG. 11, one embodiment of a presence federation system is shown where like components have similar numbers, as provided in FIG. 7. Similar to database 720, database 1120 stores presence profiles, policies, statuses, and related information, such as media describing presence states, utilized by the hosted presence aggregator service. As previously discussed, a user 725 may update his or her presence using a personal messaging device, such as a telephone 1140, and corresponding messaging service, such as an office voicemail system 1145 installed with an AP agent application 145. In this example, the user has called into the voicemail service and recorded an audio message, "I Am Out Of The Office," to be used as an outgoing message by the voicemail system. The AP agent application detects the newly generated recording for the user and relays the new recording 1150 to the hosted presence aggregator service at server 710. The hosted presence aggregator service may then push or transmit the uploaded recorded audio message 1150 to the user's federated voicemail service, including a home voicemail system 1160.

Figure 12:
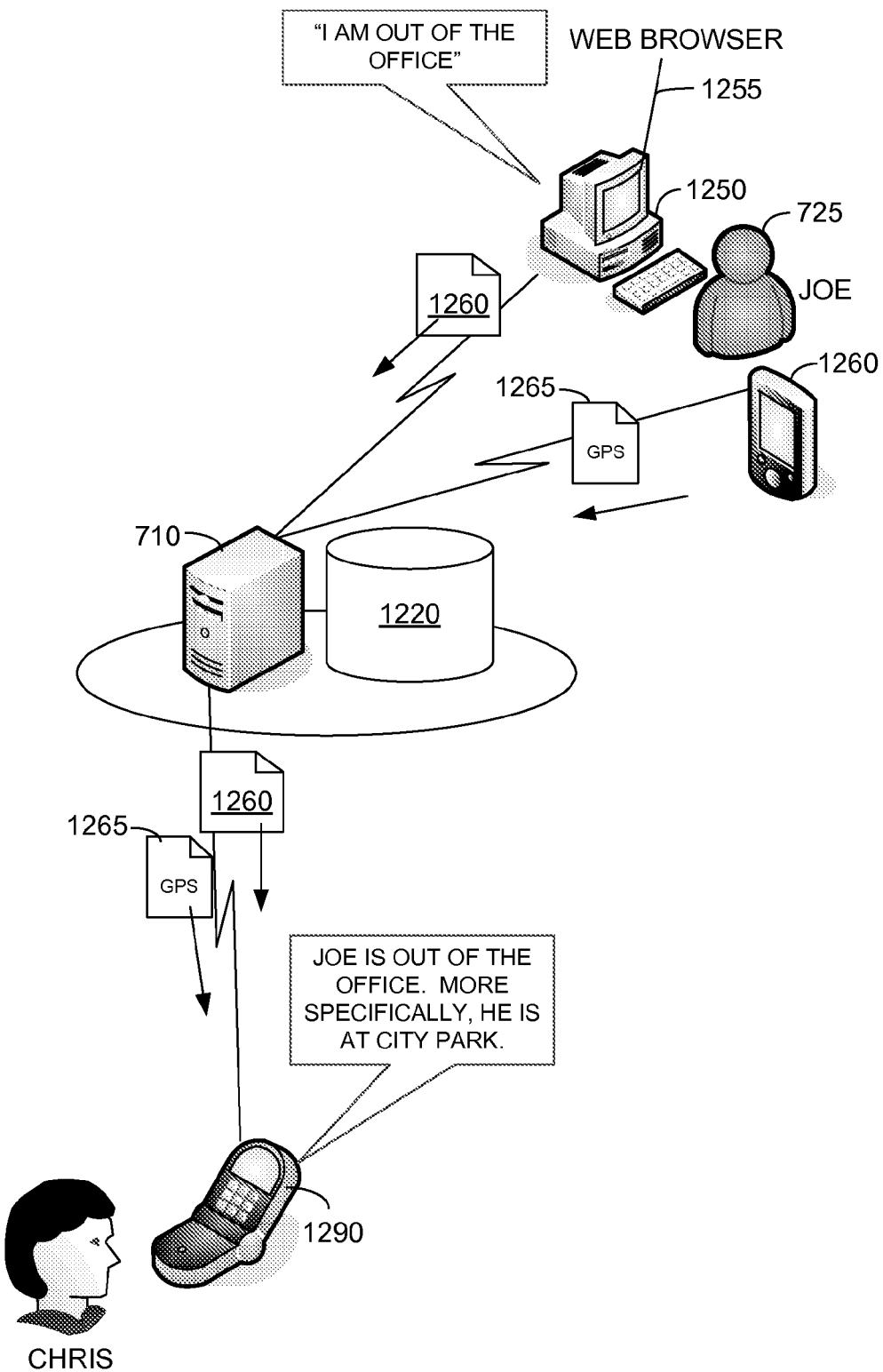
FIG. 12 is a system diagram representing one implementation of an embodiment of FIG. 1, where a user's presence information is being transmitted to other users along with the user's supplemental presence information.

In FIG. 12, one embodiment of a presence federation system is shown where like components have similar numbers, as provided in FIG. 7. Similar to database 720, database 1220 stores presence profiles, policies, statuses, and related information, such as media describing presence states, utilized by the hosted presence aggregator service. As previously discussed, a user 725 may update his or her presence using a personal messaging device, such as a personal computer 1250 installed with a web browser application 1255. In this example, the user has posted his or her presence as being "I Am Out Of The Office" with the hosted presence aggregator service at server 710 using the web browser 1255. The hosted presence aggregator service may then push or transmit the presence update 1260 to other user's federated devices, in accordance with the user's policies for distributing presence information. Further, in this example, the user also posts GPS location information 1265 to the hosted presence aggregator service at server 710 for the user's current location, such as by a personal digital assistant 1260 having a GPS receiver/transmitter. The user may set up a policy that posted GPS coordinates should be distributed to other users' federated devices when the user is not available (e.g., Out Of The Office). In the example shown, the user's presence is indicated as being Out Of The Office and being at the City Park on another user's federated device (e.g., Chris' GPS-enabled phone 1290), as designated by the user's policy settings. Alternatively, the server 710 may receive GPS coordinates from a user and convert them into a street address or other textual description of the user's current location and provide this information to another user.

Figure 13:
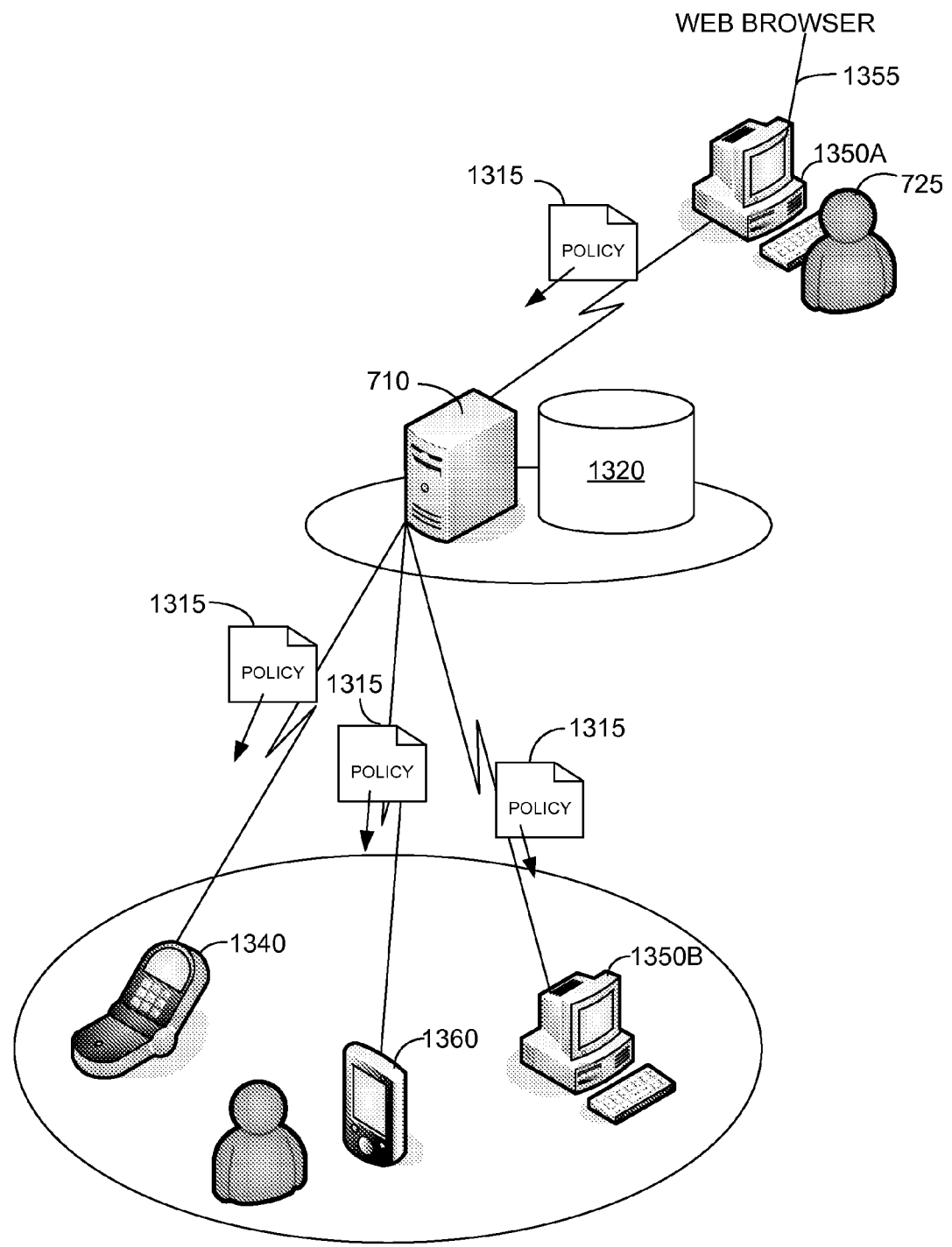
FIG. 13 is a system diagram representing one implementation of an embodiment of FIG. 1, where a user's policy is being transmitted to a federation of user devices.

Referring now to FIG. 13, one embodiment of a presence federation system is shown. Similar to database 720, database 1320 stores presence profiles, policies 1315, statuses, and related information, such as media describing presence states, utilized by the hosted presence aggregator service at server 710. As previously discussed, a user 725 may set a policy, such as one specifying act-on behavior in response to presence states using a personal messaging device, such as a personal computer 1350 installed with a web browser application 1355. In this example, the user has posted a policy 1315 with the hosted presence aggregator service at server 710 using the web browser 1355. The hosted presence aggregator service may then push or transmit the policy update 1315 to the other user's federated devices 1340, 1350B, 1360 so that these devices may behave in accordance with the policy 1315.

Figure 14:
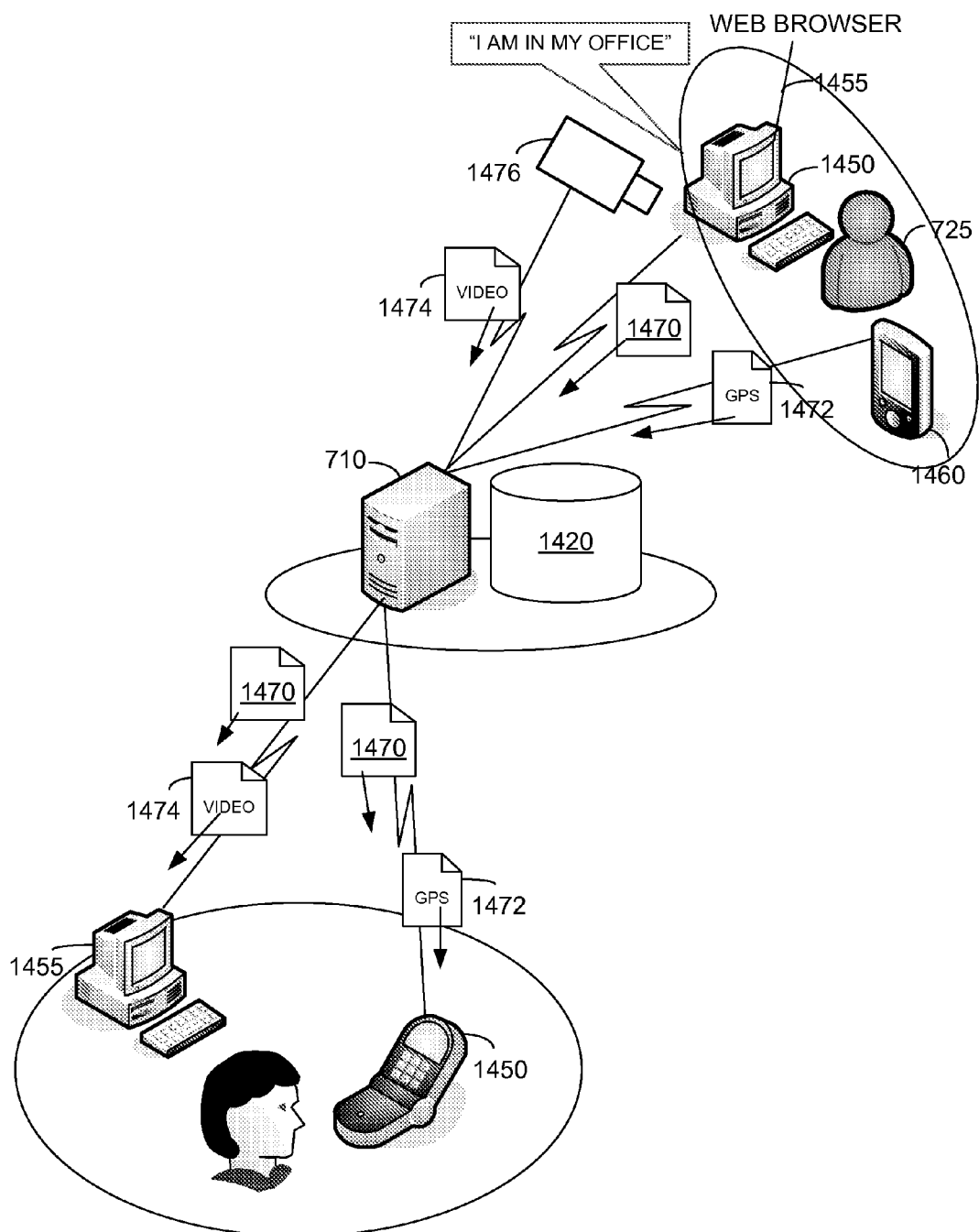
FIG. 14 is a system diagram representing one implementation of an embodiment of FIG. 1, where a user's presence information is being transmitted to other users along with the user's supplemental presence information in accordance with a user's policy settings.

In FIG. 14, one embodiment of a presence federation system is shown. Similar to database 720, database 1420 stores presence profiles, policies, statuses, and related information, such as media describing presence states, utilized by the hosted presence aggregator service at server 710. As previously discussed, a user 725 may update his or her presence using a personal messaging device, such as a personal computer 1450 installed with a web browser application 1455. In this example, the user has posted his or her presence as being "I Am In My Office" by selecting this state using a web browser interface to the hosted presence aggregator service. The hosted presence aggregator service at server 710 may then push or transmit the presence update 1470 to other user's federated devices, in accordance with the user's policies for distributing presence information.

Further, in this example, the user also posts GPS location information 1472 to the hosted presence aggregator service at server 710 for the user's current location, such as by a personal digital assistant 1460 having a GPS receiver/transmitter. The user may set up a policy that posted GPS coordinates should be distributed to other user's federated devices along with his or her presence information. In the example shown, the user's presence 1470 and location information 1472 are provided to another user's phone 1450. In addition, in this example, the user also posts video information 1474 from a camera 1476 in the user's office location. The video information 1474 is transmitted to the hosted presence aggregator service at server 710, where the user may have set up a policy that posted video should be distributed to other users' federated devices 1450, 1455 along with his or her presence information 1470. In the example shown, the user's presence 1470 and location information 1472 are provided to another user's telephone device 1450, and the user's presence 1470 and video information 1474 are provided to the other user's computing device 1455. Accordingly, the user's policy may specify that certain supplemental information, such as location information 1472 or video 1474, should be provided to certain devices, such that the AP agents 145 installed on these certain devices 1450, 1455 receive or retrieve the designated supplemental information from the hosted presence aggregator service at server 710.

Figure 15:
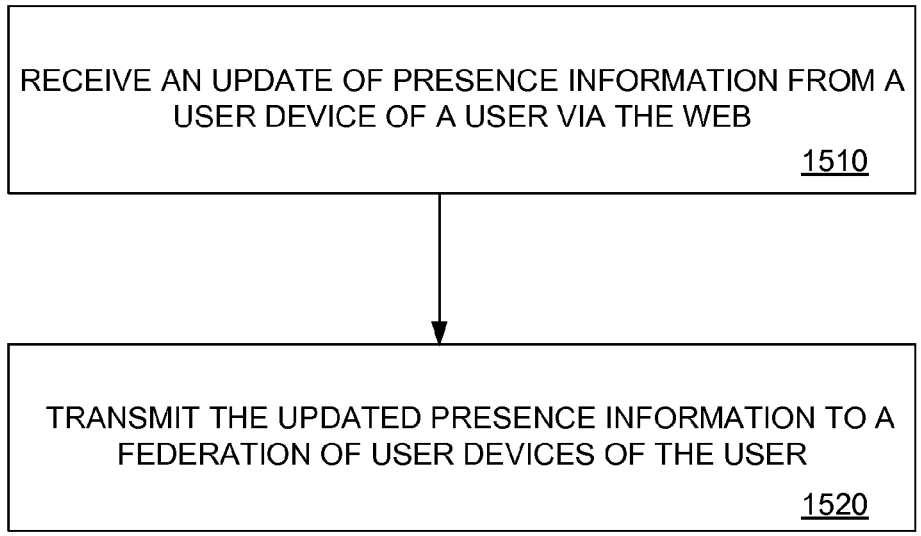
FIGS. 15-21 are flow chart diagrams depicting embodiments of a hosted presence aggregator process in accordance with the present disclosure.

Referring now to FIG. 15, one embodiment of a hosted presence aggregator process is depicted. In one embodiment, this process is tied to a computer, as illustrated in FIG. 2. In block 1510, an update of presence information is received from a user device 130 of a user 725. The update may be posted to a web service by a user via a web browser 730, in one embodiment. A hosted presence aggregator 120 then publishes or transmits (block 1520) the updated presence information to a federation of user devices, such as a telephone 740, a personal computer 750 (and installed messaging applications), and a personal digital assistant 760 of the user 725.

Figure 16:
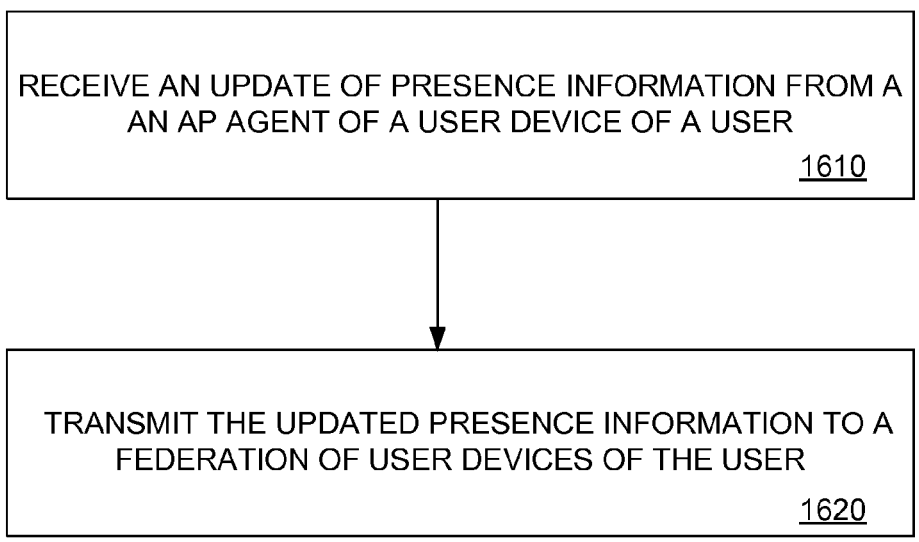

In FIG. 16, one embodiment of a hosted presence aggregator process is depicted. In one embodiment, this process is tied to a computer, as illustrated in FIG. 2. In block 1610, an update of presence information is received from a user device 130. The update may be transmitted from a AP agent 145 on a user device 860 upon which the update was generated. A hosted presence aggregator service 120 then publishes the updated presence information to a federation of user devices 130, such as a telephone 840, a personal computer 850 (and installed messaging applications), and a personal digital assistant 760.

Figure 17:
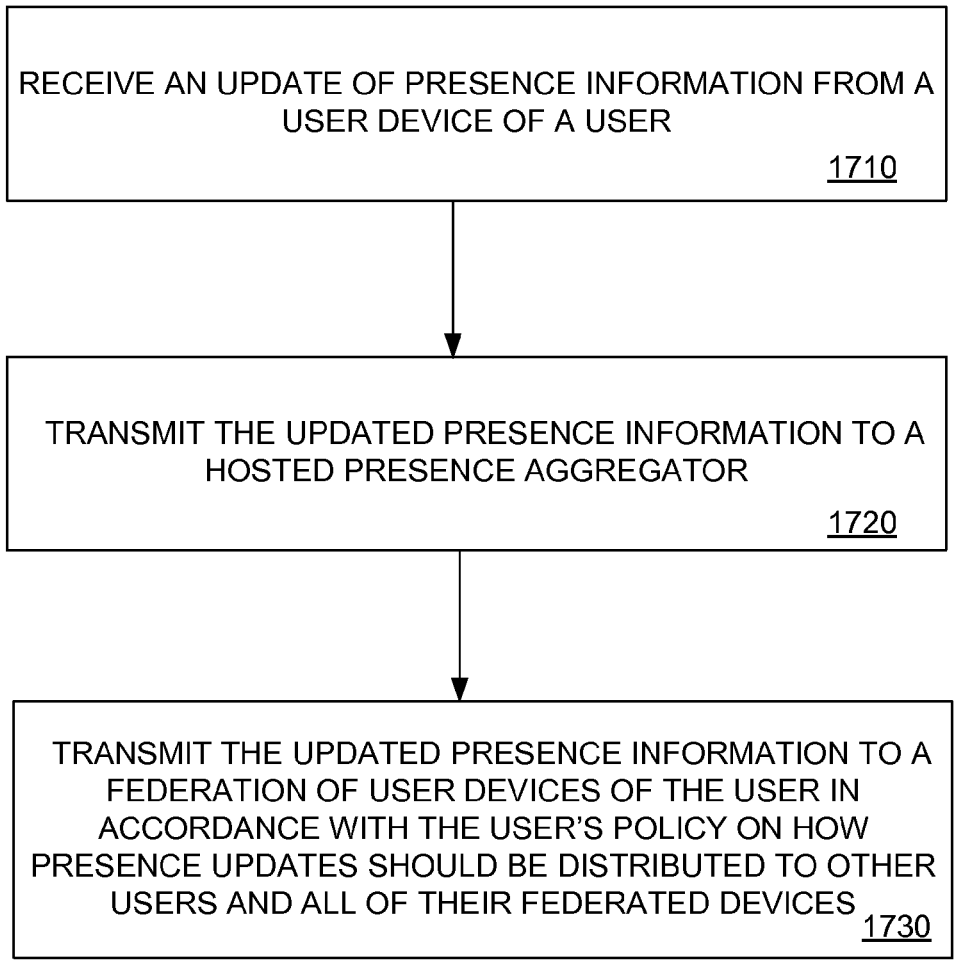

In FIG. 17, one embodiment of a hosted presence aggregator process is depicted. In one embodiment, this process is tied to a computer, as illustrated in FIG. 2. In block 1710, an update of presence information is received from a user device. The update may be detected from an AP agent 145 on a user device 130 upon which the update was generated. The newly detected presence information may then be relayed or transmitted to a hosted presence aggregator 120 in block 1720. The hosted presence aggregator 120 publishes or transmits (block 1730) the updated presence information to a federation of user devices 130, 860, such as a telephone 880A, 890A, a computer 890B (and installed messaging applications), and a personal digital assistant 880B, in accordance with the user's policy on how presence updates should be distributed to other users and all of their federated devices 880, 890.

Figure 18:
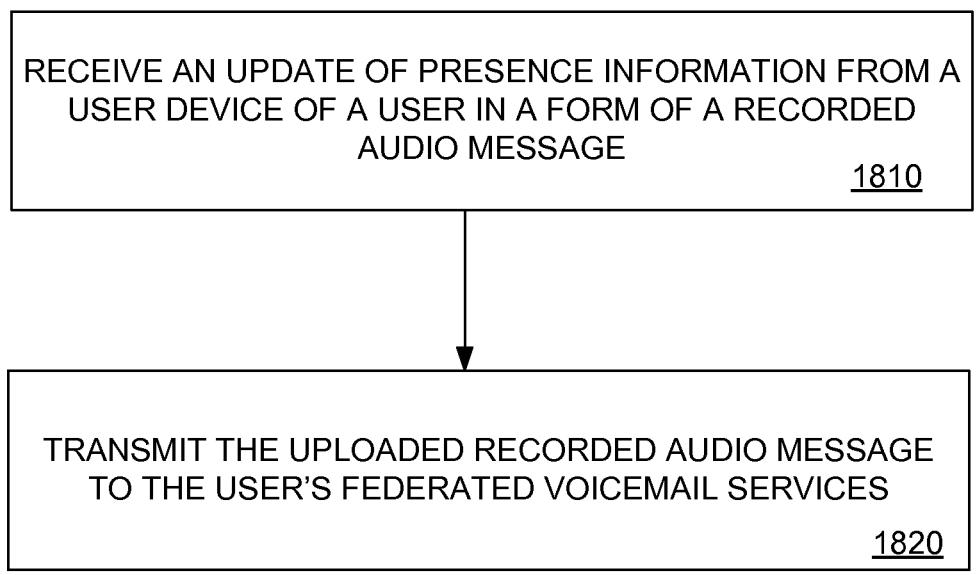

Referring now to FIG. 18, one embodiment of a hosted presence aggregator process is depicted. In one embodiment, this process is tied to a computer, as illustrated in FIG. 2. In block 1810, an update of presence information is received from a personal messaging device, such as a personal computer 1050 installed with a web browser application 1055 in a form of a recorded audio message. In this example, the user has posted his or her presence as being "I Am Out Of The Office" by uploading a recorded audio message 1060 to the hosted presence aggregator 120 from the web browser 1055. The hosted presence aggregator 120 may then push or transmit the uploaded recorded audio message 1060 to the user's federated voicemail services, including an office voicemail system 1040 and a home voicemail system 1050, as shown in block 1820.

Figure 19:
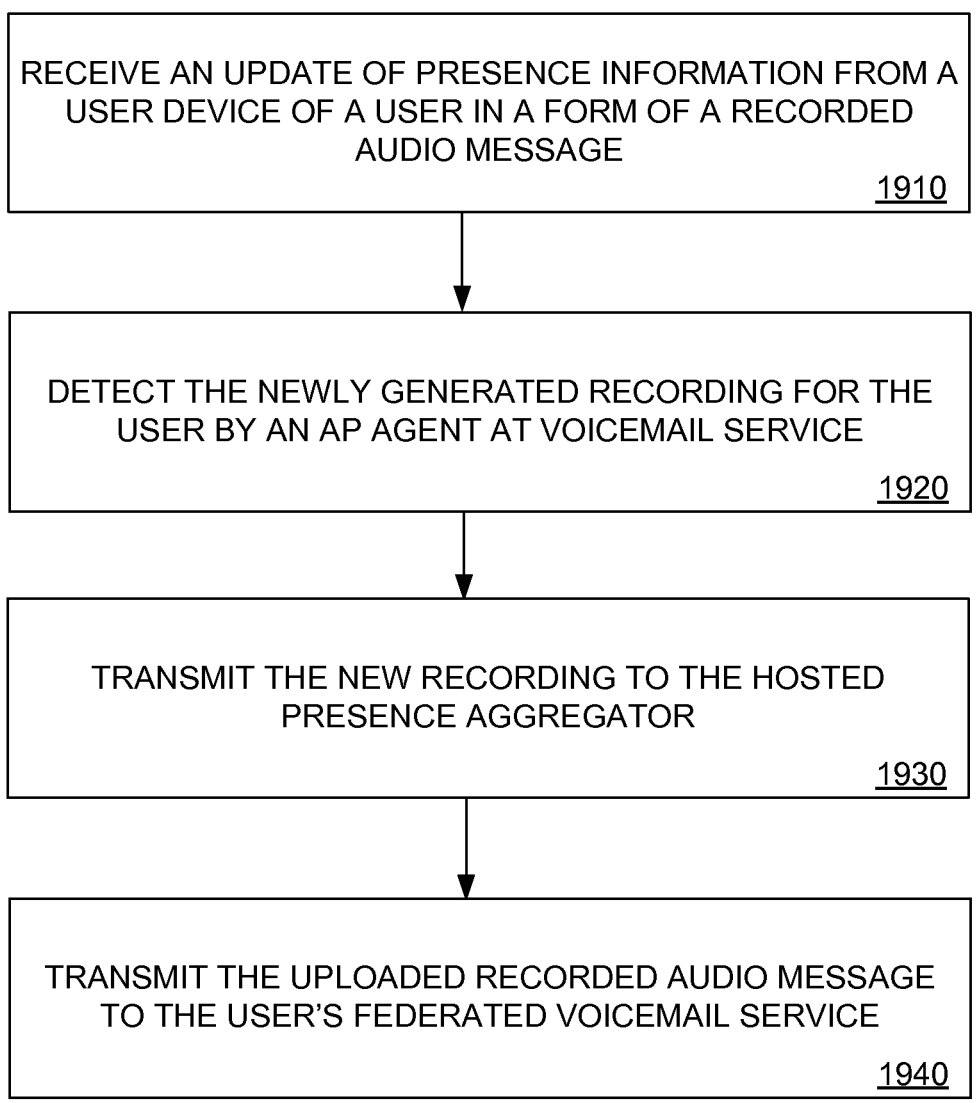

Referring now to FIG. 19, one embodiment of a hosted presence aggregator process is depicted. In one embodiment, this process is tied to a computer, as illustrated in FIG. 2. In block 1910, an update of presence information (e.g., network presence state) from a user is received. The update in a form of a recorded audio message pertains to the user's presence and is made using a personal messaging device, such as a telephone 1140, and corresponding messaging service, such as an office voicemail system 1145 installed with an AP agent application 145. For example, the user may call into the voicemail service 1145 and record an audio message, "I Am Out Of The Office," to be used as an outgoing message by the voicemail system 1145. The AP agent application 145 detects (block 1920) the newly generated recording for the user and relays or transmits (block 1930) the new recording to the hosted presence aggregator 120. The hosted presence aggregator 120 may then push or transmit (1940) the uploaded recorded audio message to the user's federated voicemail service, including a home voicemail system 1160.

Figure 20:
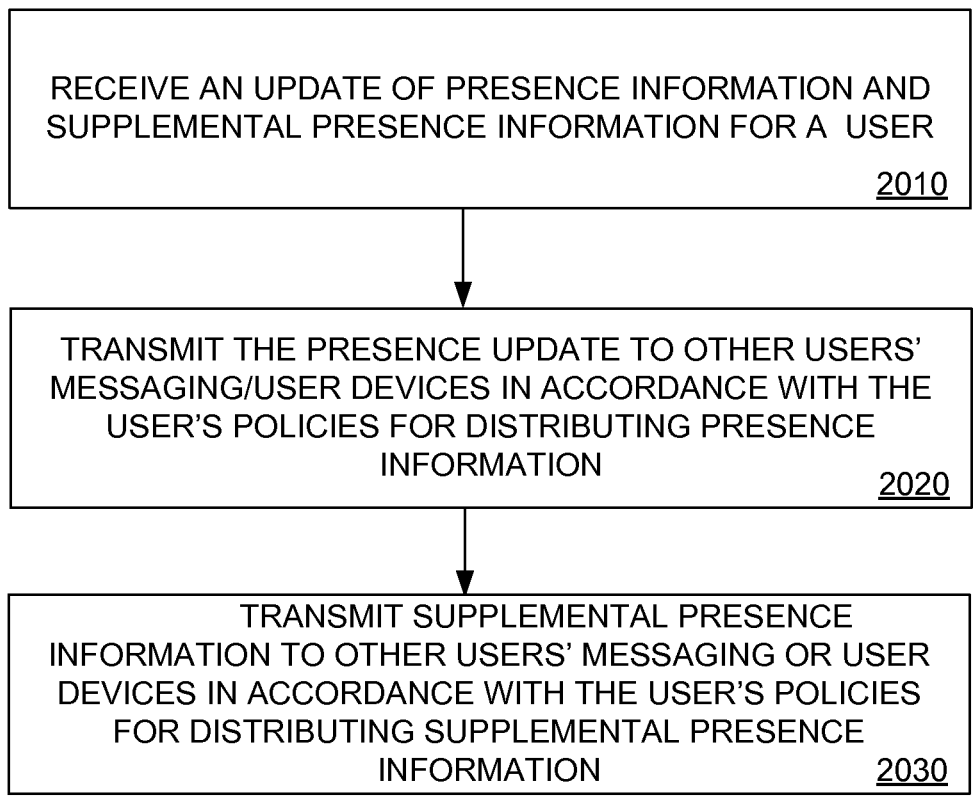

In FIG. 20, one embodiment of a hosted presence aggregator process is depicted. In one embodiment, this process is tied to a computer, as illustrated in FIG. 2. In accordance with this process, a presence update from a personal messaging device, such as a personal computer 1250 installed with a web browser application 1255, is received (block 2010) at a host presence aggregator 120. For example, the user may post his or her presence as being "Out Of The Office" with the hosted presence aggregator 120 using the web browser 1255. The hosted presence aggregator 120 may then push or transmit (block 2020) the presence update to other users' messaging or user devices, in accordance with the user's policies for distributing presence information along with supplemental presence information. For example, the user or user devices might have posted or transmitted (block 2010) supplemental presence information in the form of GPS location information to the hosted presence aggregator service for the user's current location, such as by a personal digital assistant 1260 having a GPS card. The user may set up a policy that posted GPS coordinates should be distributed to other user's messaging devices when the user is not available (e.g., "Out Of The Office"). For example, the user's presence may be indicated as being "Out Of The Office" and being at the City Park location on another user's device, as designated by the user's policy settings. Therefore, the supplemental presence information (e.g., GPS location information) is also transmitted (block 2030) to other users' messaging or user devices.

Figure 21:
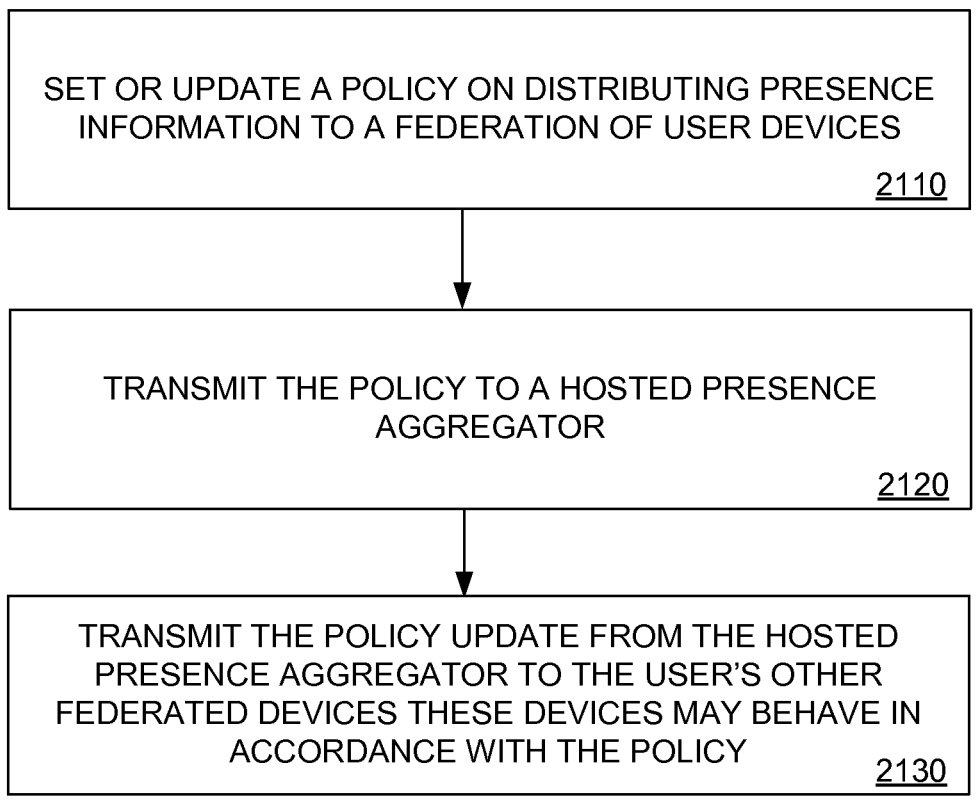

Referring now to FIG. 21, one embodiment of a hosted presence aggregator process is depicted. In one embodiment, this process is tied to a computer, as illustrated in FIG. 2. A user 725 sets or updates (block 2110) a policy, such as a policy designating act-on behavior in response to presence states using a personal messaging device, such as a personal computer 1350 installed with a web browser application 1355. In this example, the user 725 has posted or transmitted (block 2120) a policy 1315 to the hosted presence aggregator 120 using the web browser 1355. The hosted presence aggregator 120 may then push or transmit (block 2130) the policy update to the user's other federated devices 1340, 1350, 1360 so that these devices may behave in accordance with the policy 1315.

In accordance with the above-described embodiments, a device does not need to be SIP aware to publish presence status updates and/or provide instant messaging functionality. Non-SIP connected devices (which include includes legacy public branch exchange telephone switches, email servers, hosted web-based e-mail platforms, web servers, carrier telephone switches, legacy office voicemail, carrier hosted voicemail platforms, non-IP cellular voicemail, cellular switching infrastructure, etc.) outside of a SIP, SIMPLE, or XMPP-aware environment now have a way to publish presence updates.

As a non-limiting example, a web server can communicate with user agents placed into each device to obtain and modify current presence information. This allows a single user to manage presence on multiple devices simultaneously. In the case of exchange carrier infrastructure (e.g., carrier telephone switches and cellular switching infrastructure) the carrier may maintain agent access for the user using a certificate. The user agent makes the device presence-aware, without the need of a SIP, SIMPLE, or XMPP environment. Further in this example, presence aggregation takes place in a hosted web environment versus a standalone unified communications environment where local SIP proxy servers only have presence information available from SIP or XMPP-capable local devices.

It should be emphasized that the above-described embodiments of the present disclosure are merely possible examples of implementations, merely set forth for a clear understanding of the principles of the disclosure. Any process descriptions or blocks in flow charts should be understood as representing modules, segments, or portions of code which include one or more executable instructions for implementing specific logical functions or steps in the process, and alternate implementations are included in which functions may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. All such modifications and variations are intended to be included herein within the scope of this disclosure.

Therefore, having thus described embodiments of the invention, at least the following is claimed:

1. A method comprising:
   receiving, at a hosted presence aggregator, a presence status update from a first device of a federation of user devices associated with a first user;
   transmitting a presence status to all other user devices of the federation of the user devices based on the presence status update and a first policy designating a first act-on behavior to be implemented by each of the user devices in the federation of the user devices for a particular presence state, the first act-on behavior based on the particular presence state, an identification of a user attempting to communicate with the first user, and a priority of a communication from the user attempting to communicate with the first user, the presence status comprising information indicating how to reach the first user who is away from the federation of the user devices;

receiving supplemental presence information associated with the first user from a device that is in communication with the hosted presence aggregator and is not part of the federation of the user devices, the supplemental presence information comprising an identification of a current location of the device that is not part of the federation of the user devices;

transmitting the supplemental presence information, comprising the identification of the current location of the device that is not part of the federation of the user devices, to other users' messaging devices, the transmitting the supplemental presence information based on the receiving the supplemental presence information and a second policy designating a second act-on behavior to be implemented when the supplemental presence information is received from the device that is not part of the federation of the user devices, the second act-on behavior designating that the supplemental presence information should be distributed to the other users' messaging devices;

receiving a request for a current location of the first user from the first device of the federation of the user devices; and transmitting the identification of the current location of the device that is not part of the federation of the user devices to the first device of the federation of the user devices in response to the request.

2. The method of claim 1, wherein the second policy identifies when the supplemental presence information should be transmitted to the other users' messaging devices.

3. The method of claim 1, wherein the first policy and the second policy are specified by the first user via a web user interface.

4. The method of claim 1, further comprising:
receiving an outgoing message announcement from the first user via one of the user devices in the federation of the user devices,
wherein the presence status update comprises the outgoing message announcement.

5. An hosted presence aggregator comprising:
a processor; and
a memory to store computer program instructions, the computer program instructions when executed on the processor cause the processor to perform operations comprising:
receiving a presence status update from a first device of a federation of user devices associated with a first user;
transmitting a presence status to all other user devices of the federation of the user devices based on the presence status update and a first policy designating a first act-on behavior to be implemented by each of the user devices in the federation of the user devices for a particular presence state, the first act-on behavior based on the particular presence state, an identification of a user attempting to communicate with the first user, and a priority of a communication from the user attempting to communicate with the first user, the presence status comprising information indicating how to reach the first user who is away from the federation of the user devices;

receiving supplemental presence information associated with the first user from a device that is in communication with the hosted presence aggregator and is not part of the federation of the user devices, the supplemental presence information comprising an identification of a current location of the device that is not part of the federation of the user devices;

transmitting the supplemental presence information, comprising an identification of a current location of the device that is not part of the federation of the user devices, to other users' messaging devices, the transmitting the supplemental presence information based on the receiving the supplemental presence information and a second policy designating a second act-on behavior to be implemented when the supplemental presence information is received from the device that is not part of the federation of the user devices, the second act-on behavior designating that the supplemental presence information should be distributed to the other users' messaging devices;

receiving a request for a current location of the first user from the first device of the federation of the user devices; and transmitting the identification of the current location of the device that is not part of the federation of the user devices to the first device of the federation of the user devices in response to the request.

6. The hosted presence aggregator of claim 5, wherein the second policy identifies when the supplemental presence information should be transmitted to the other users' messaging devices in the federation of the user devices.

7. The hosted presence aggregator of claim 5, wherein the first policy and the second policy are specified by the first user via a web user interface.

8. The hosted presence aggregator of claim 5, the operations further comprising:
receiving an outgoing message announcement from the first user via one of the user devices in the federation of the user devices,
wherein the presence status update comprises the outgoing message announcement.

9. A non-transitory computer readable medium storing computer program instructions, which, when executed on a processor, cause the processor to perform operations comprising:
receiving, at a hosted presence aggregator, a presence status update from a first device of a federation of user devices associated with a first user;
transmitting a presence status to all other user devices of the federation of the user devices based on the presence status update and a first policy designating a first act-on behavior to be implemented by each of the user devices in the federation of the user devices for a particular presence state, the first act-on behavior based on the particular presence state, an identification of a user attempting to communicate with the first user, and a priority of a communication from the user attempting to communicate with the first user, the presence status comprising information indicating how to reach the first user who is away from the federation of the user devices;

receiving supplemental presence information associated with the first user from a device that is in communication with the hosted presence aggregator and not part of the federation of the user devices, the supplemental presence information comprising an identification of a current location of the device that is not part of the federation of the user devices;

transmitting the supplemental presence information, comprising an identification of a current location of the device that is not part of the federation of the user devices, to other users' messaging devices, the transmitting the supplemental presence information based on the receiving the supplemental presence information and a second policy designating a second act-on behavior to be implemented when the supplemental presence information is received from the device that is not part of the federation of the user devices, the second act-on behavior designating that the supplemental presence information should be distributed to the other users' messaging devices;

receiving a request for a current location of the first user from the first device of the federation of the user devices; and transmitting the identification of the current location of the device that is not part of the federation of the user devices to the first device of the federation of the user devices in response to the request.

10. The non-transitory computer readable medium of claim 9, wherein the second policy identifies when supplemental presence information should be transmitted to the other users' messaging devices.

11. The non-transitory computer readable medium of claim 9, wherein the first policy and the second policy are specified by the first user via a web user interface.

\* \* \* \* \*